US008164779B2

(12) United States Patent
Endo

(10) Patent No.: US 8,164,779 B2
(45) Date of Patent: Apr. 24, 2012

(54) DATA COMMUNICATION APPARATUS AND METHOD

(75) Inventor: Tomoaki Endo, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 12/883,586

(22) Filed: Sep. 16, 2010

(65) Prior Publication Data

US 2011/0002011 A1    Jan. 6, 2011

Related U.S. Application Data

(60) Continuation of application No. 11/754,745, filed on May 29, 2007, now Pat. No. 7,839,529, which is a division of application No. 10/835,474, filed on Apr. 30, 2004, now Pat. No. 7,239,434, which is a division of application No. 09/178,420, filed on Oct. 26, 1998, now Pat. No. 6,801,340.

(30) Foreign Application Priority Data

Oct. 27, 1997    (JP) ...................................... 9-293960
Oct. 27, 1997    (JP) ...................................... 9-294661

(51) Int. Cl.
    *G06F 3/12*    (2006.01)
(52) U.S. Cl. ....... 358/1.15; 358/403; 358/442; 709/233; 709/224
(58) Field of Classification Search ................. 358/1.15, 358/434, 442, 403, 400, 402; 709/233, 223, 709/224, 232, 370, 234; 395/311, 200.02, 395/550, 725
See application file for complete search history.

(56) References Cited

U.S. PATENT DOCUMENTS

| 4,733,303 | A | * | 3/1988 | Koshiishi ...................... 358/400 |
| 4,910,765 | A | * | 3/1990 | Matsuse et al. .......... 379/100.09 |
| 5,095,445 | A |   | 3/1992 | Sekiguchi |
| 5,361,138 | A |   | 11/1994 | Motegi |
| 5,544,335 | A | * | 8/1996 | Motomura ..................... 709/228 |
| 5,548,789 | A |   | 8/1996 | Nakamura |

(Continued)

FOREIGN PATENT DOCUMENTS

EP    0 483 969    5/1992

(Continued)

OTHER PUBLICATIONS

"Storage of the Capabilities of Frequently Called Facsimile Machines", IBM Technical Disclosure Bulletin, US, IBM Corp. New York, vol. 32, No. 12, p. 34, XP000105064 (May 1, 1990).

(Continued)

*Primary Examiner* — Negussie Worku
(74) *Attorney, Agent, or Firm* — Fitzpatrick, Cella, Harper & Scinto

(57) ABSTRACT

A document transmission apparatus reduces troublesome labor of an operator when transmitting document data, inputted from a scanner or the like, by various transmission methods such as electronic mail, facsimile, remote printing and file transfer. An address book containing a receiver and a plurality of transmission methods for transmitting document data to the receiver is generated. Upon transmission instruction, an appropriate transmission method is selected by the receiver, then document data is converted into data of an appropriate data format, and the converted data is transmitted. Further, a notice of transmission indicating that the document data has been transmitted is transmitted to the receiver of the document data by a method different from the transmission method of the document data. Thus, the document data can be reliably delivered to the receiver.

8 Claims, 27 Drawing Sheets

U.S. PATENT DOCUMENTS

| | | | |
|---|---|---|---|
| 5,623,345 | A | 4/1997 | Merchant |
| 5,726,777 | A | 3/1998 | Yoshida |
| 5,802,314 | A | 9/1998 | Tullis |
| 5,812,278 | A | 9/1998 | Toyoda |
| 5,872,639 | A | 2/1999 | Hongu |
| 5,881,233 | A * | 3/1999 | Toyoda et al. ............... 709/233 |
| 5,896,207 | A | 4/1999 | Tomda |
| 6,034,970 | A | 3/2000 | Levac |
| 6,069,706 | A | 5/2000 | Kajita |
| 6,072,862 | A * | 6/2000 | Srinivasan ............. 379/100.08 |
| 6,125,207 | A | 9/2000 | Merchant |
| 6,230,189 | B1 * | 5/2001 | Sato et al. .................... 709/206 |
| 6,268,426 | B1 | 7/2001 | Hirabayashi |
| 6,278,532 | B1 | 8/2001 | Heimendinger |
| 6,370,587 | B1 * | 4/2002 | Hasegawa et al. ............ 709/245 |
| 6,374,291 | B1 | 4/2002 | Ishibashi |
| 6,801,340 | B1 | 10/2004 | Endo |
| 6,888,998 | B1 * | 5/2005 | Koike et al. ................... 386/200 |
| 7,127,532 | B2 * | 10/2006 | Oomori ............................ 710/8 |
| 7,230,434 | B1 | 6/2007 | Sasaki |
| 7,239,434 | B2 * | 7/2007 | Endo ............................ 358/474 |
| 7,245,391 | B2 * | 7/2007 | Nishimura .................. 358/1.15 |
| 2001/0013050 | A1 | 8/2001 | Shah |
| 2001/0013069 | A1 | 8/2001 | Shah |
| 2002/0051222 | A1 * | 5/2002 | Nishimura ................... 358/402 |
| 2002/0155849 | A1 * | 10/2002 | Urano et al. .................. 455/466 |
| 2006/0190622 | A1 | 8/2006 | Kitada |

FOREIGN PATENT DOCUMENTS

| | | |
|---|---|---|
| JP | 62-232261 | 10/1987 |
| JP | 63-232745 | 9/1988 |
| JP | 01-106543 | 4/1989 |
| JP | 2-35563 | 3/1990 |
| JP | 04-137972 | 5/1992 |
| JP | 04-150160 | 5/1992 |
| JP | 07-271533 | 10/1995 |
| JP | 7-297975 | 11/1995 |
| JP | 08-018717 | 1/1996 |
| JP | 08-194636 | 7/1996 |
| JP | 08-202607 | 8/1996 |
| JP | 08-204703 | 8/1996 |
| JP | 08-278865 | 10/1996 |
| JP | 08-314923 | 11/1996 |
| JP | 09-046505 | 2/1997 |
| JP | 09-149076 | 6/1997 |
| JP | 9-149189 | 6/1997 |
| JP | 09-181767 | 7/1997 |
| JP | 9-233216 | 9/1997 |
| JP | 09-270818 | 10/1997 |
| JP | 09-274580 | 10/1997 |

OTHER PUBLICATIONS

P.R. Chesnais, "Canard: A Framework for Community Messaging", Wearable Computers, 1997. Digest of Papers. First International Symposium on Cambridge, MA, USA, Oct. 13-14, 1997, IEEE Computer Society, pp. 108-115.

M. Katsumata, et al., "An Enhanced Electronic Mail System", 1992 IEEE Region 10 International Conference, Melbourne, Vic., Australia, Nov. 11-13, 1992, pp. 664-668.

Japanese Office Action dated Nov. 20, 2007 issued during prosecution of counterpart application No. JP 2005-312858.

* cited by examiner

FIG. 4

| DESTINATION ADDRESS | TRANSMISSION METHOD | FORMAT1 | FORMAT2 | FORMAT3 |
|---|---|---|---|---|
| abc@cde.fg.jl.lm | e-mail | TIFF-MMR | JPEG | JPEG |
| xyz.fg.jl.lm | database | BMP | TIFF-MMR | JPEG |
| pqr.klm.jal/abc/def | ftp | TIFF-MH | TIFF-MMR | JPEG |
| 03-1234-4566 | fax | | | |
| vcx@cde.fg.jl.lm | e-mail | TIFF-MMR | BMP | JPEG |
| abc.fg.jl.lm | database | BMP | TIFF-MMR | TIFF-MMR |
| lmn.lkj.jp | lpr | PCL | PCL | |
| qwe.rty.uio | lpr | | | PCL |
| | | | | |

| 501 | 502 | 503 | 504 | 505 |
|---|---|---|---|---|
| DESTINATION ADDRESS | TRANSMISSION METHOD | FORMAT1 | FORMAT2 | FORMAT3 |
| abc@cde.fg.jl.lm | e-mail | TIFF-MMR | JPEG | JPEG |
| pqr.klm.jal/abc/def | ftp | TIFF-MH | TIFF-MMR | JPEG |
| 03-1234-4566 | fax | | | |
| abc.fg.jl.lm | database | BMP | TIFF-MMR | TIFF-MMR |
| lmn.lkj.jp | lpr | | | |
| vcx@cde.fg.jl.lm | e-mail | TIFF-MMR | BMP | JPEG |
| qwe.rty.uio | lpr | PCL | PCL | PCL |

FIG. 6

| TRANSMISSION METHOD | FORMAT1 | FORMAT2 | FORMAT3 |
|---|---|---|---|
| e-mail | TIFF-MH | TIFF-MMR | JPEG |
| ftp | TIFF-MMR | BMP | JPEG |
| lpr | LIPS | LIPS | LIPS |
| fax | NONE | NONE | NONE |
| database | BMP | BMP | JPEG |

| DESTINATION ADDRESS | TRANSMISSION METHOD | FORMAT3 |
|---|---|---|
| abc@cde.fg.jl.lm | e-mail | JPEG |
| vcx@cde.fg.jl.lm | e-mail | JPEG |
| pqr.klm.ja/abc/def | ftp | JPEG |
| abc.fg.jl.lm | database | TIFF-MMR |
| lmn.lkj.jp | lpr | LIPS |
| qwe.rty.uio | lpr | PCL |
| 03-1234-4566 | fax | |

701 702 705

FIG. 9
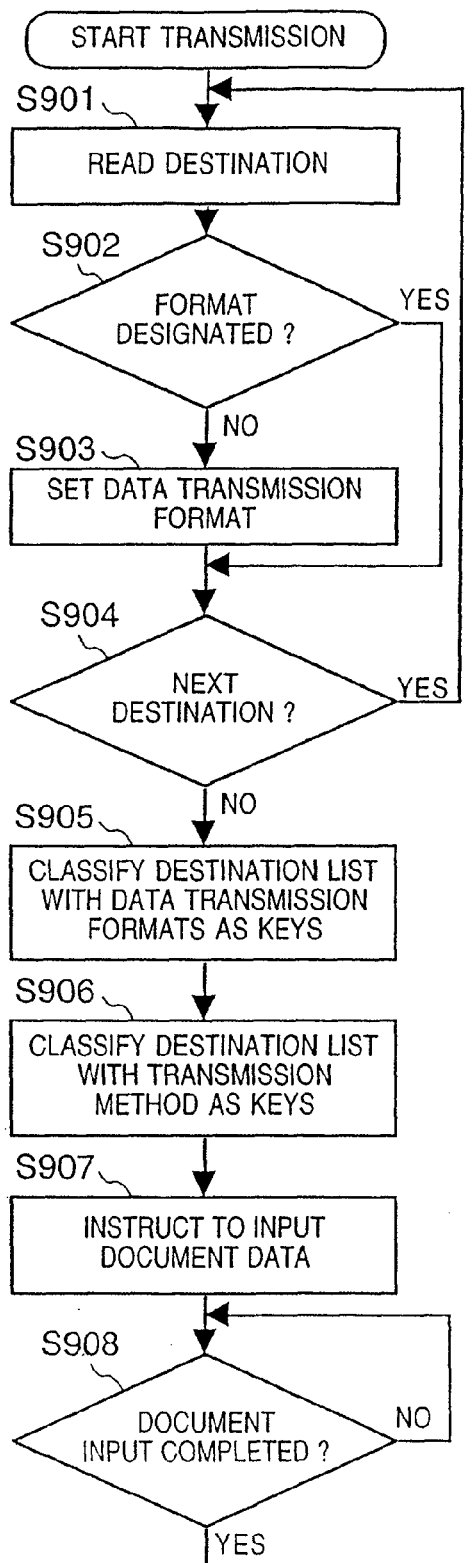
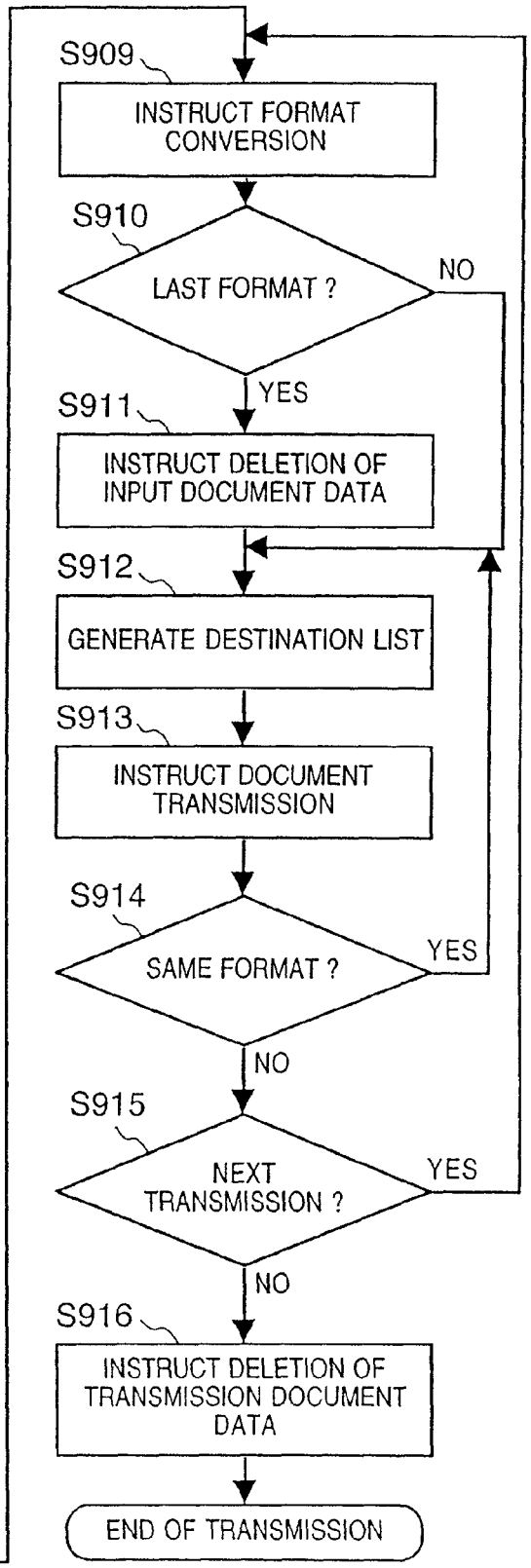

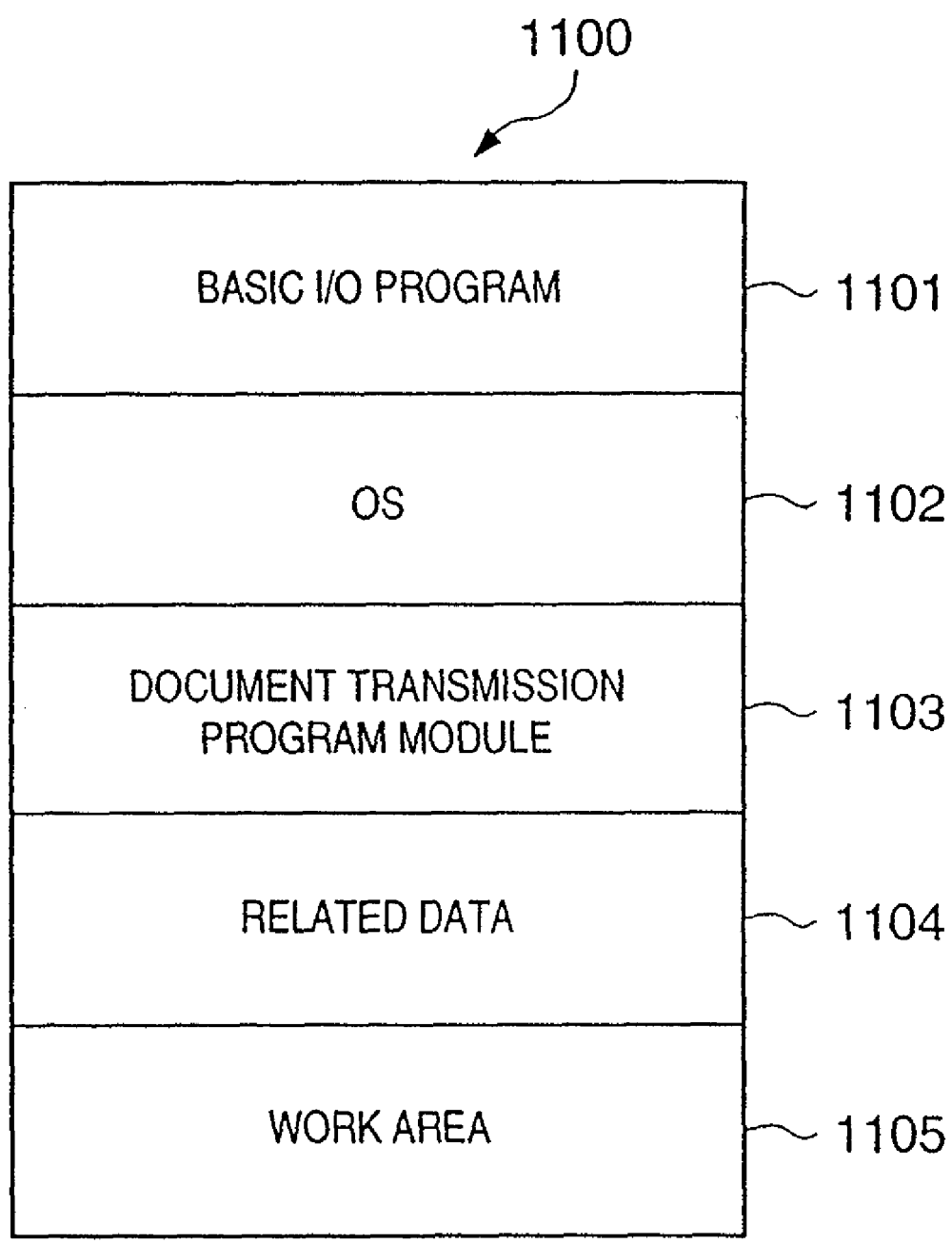

FIG. 15

ABSTRACT DESTINATION FILE

| ABSTRACT DESTINATION NAME | ABSTRACT DESTINATION NUMBER |
|---|---|
| Hiromi Washida | 1001 |
| Tomoaki Endoh | 1002 |
| Minnie Mouse | 1003 |

DETAILED DESTINATION FILE
( FILE NAME : 1003 )

| TRANSMISSION METHOD | DETAILED DESTINATION | FLAG |
|---|---|---|
| e-mail | minnie@cse.canon.co.jp | 1 |
| fax | +81(3)5482 5957 | 1 |
| lpr | lbp-930.cse.canon.co.jp | 0 |
| ftp | bean.cse.canon.co.jp | 0 |

FIG. 22

```
// Example Data Base //
dn:MFS System TASKS/Canon Inc/JP
cn:MFS System TASKS
member:Micky Mouse/CP Team/DO Project/Canon Inc/JP
member:Minnie Mouse/CP Team/DO Project/Canon Inc/JP
objectClass:group dn:Micky Mouse/CP Team/DO Project/Canon Inc/JP
cn:Micky Mouse
objectClass:person dn:Micky Mouse/CP Team/DO Project/Canon Inc/JP
cn:Minnie Mouse
mail:minnie@cse.canon.co.jp
telephoneNumber:612-37242
telephoneNumber:+81(3)5482 8324
facsimileTelephoneNumber:+81(3)5482 5957
postalAddress:30-2,Shimomaruko 3-chome, Ota-ku,Tokyo 146, Japan
c:JP
defaultPrinter:lbp-930.cse.canon.co.jp
ftp:bean.cse.canon.co.jp
mediaSheets:LTR:1
mediaSheets:LTRR:2
deliveryMethod:e-mail
deliveryMethod:fax
objectClass:person dn:CanonGP215/CP Team/DO Project/Canon Inc/JP
cn:CanonGP215
type:electrophotographic-laser
serverAddress:BEAN
resolution:600
sides:1-side
sides:duplex
finishings:sort
protocol:Salutation
remortCopy:TRUE
objectClass:printer dn:LBP-930-BEAN/CP Team/DO project/Canon Inc/JP
cn:LBP-930-BEAN
type:electrophotographic-laser
serverAddress:BEAN
resolution:600
sides:1-side
sides:duplex
finishings:sort
protocol:Salutation
remortCopy:TRUE
objectClass:printer
```

Labels: 2201, 2202, 2203, 2204, 2205, 2206, 2207, 2208

FIG. 24

```
// Example Address Book //
dn:MFS System TASKS/Canon Inc/JP
cn:MFS System TASKS
member:Micky Mouse/CP Team/DO Project/Canon Inc/JP
member:Minnie Mouse/CP Team/DO Project/Canon Inc/JP
objectClass:group dn:Minnie Mouse/CP Team/DO Project/Canon Inc/JP
cn:Minnie Mouse
telephoneNumber:612-37242
facsimileTelephoneNumber:+81(3)5482 5957
postalAddress:30-2,Shimomaruko 3-chome, Ota-ku,Tokyo 146, Japan
c:JP
e-mail:minnie@cse.canon.co.jp
defaultPrinter:lbp-930.cse.canon.co.jp
ftp:bean.cse.canon.co.jp
deliveryMethod:e-mail [(confidential<4) | ((confidential>3)&(urgent=5))]
deliveryMethod:fax[(confidential>4)]
deliveryMethod:ftd[documentSize>1000kbyte]
deliveryMethod:printer[document=Color]
defaultDeliveryMethod:fax
invoiceDeliveryMethod:e-mail [deliveryMethod=fax]
invoiceDeliveryMethod:fax[(deliveryMethod=ftp) | (day=sun)]
defaultInvoiceDeliveryMethod:NONE
objectClass:person dn:Micky Mouse/CP Team/DO Project/Canon Inc/JP
cn:Micky Mouse
telephoneNumber:612-37262
facsimileTelephoneNumber:+81(3)2341 2235
postalAddress:30-2,Shimomaruko 3-chome, Ota-ku,Tokyo 146, Japan
c:JP
e-mail:minnie@cse.canon.co.jp
defaultPrinter:lbp-930.cse.canon.co.jp
ftp:bean.cse.canon.co.jp
deliveryMethod:e-mail [(confidential<4) | ((confidential>3)&(urgent=5))]
deliveryMethod:fax[(confidential>4)]
deliveryMethod:ftd[documentSize>1000]
deliveryMethod:printer[document=Color]
defaultDeliveryMethod:fax
invoiceDeliveryMethod:e-mail [deliveryMethod=fax]
invoiceDeliveryMethod:fax[deliveryMethod=ftp]
objectClass:person
```

| CONDITION | KEYWORD | POSSIBLE VALUE OR FORMAT |
|---|---|---|
| SECURITY | confidential | 1,2,3,4,5 ( 5 IS MAXIMUM ) |
| PRIORITY | urgent | 1,2,3,4,5 ( 5 IS MAXIMUM ) |
| PLACE | location | AREA CODE |
| DAY | day | sun, mon, tue, wed, thu, fri, sat |
| DATE | date | month/day/year |
| TIME | time | hour:minute |
| DOCUMENT ATTRIBUTE | document | color, b/w |
| NUMBER OF DOCUMENT PAGES | documentPages | INTEGRAL VALUE |
| DOCUMENT DATA SIZE | documentSize | INTEGRAL VALUE IN KB UNIT |
| TRANSMISSION METHOD | deliveryMethod | e-mail, fax, ftp, printer |
| LINE STATUS | mediaStates | OK, NG |

FIG. 27

TO : MS. MINNIE MOUSE

35 PAGE DOCUMENT WAS SENT TO lbp-930.cse.canon.co.jp BY REMOTE

PRINTING AT 14 : 43 AUG.2, 1997

DATA COMMUNICATION APPARATUS AND METHOD

This application is a continuation of application Ser. No. 11/754,745, filed on May 29, 2007 (allowed), now U.S. Pat. No. 7,839,529, which is a division of Ser. No. 10/835,474, filed Apr. 30, 2004 (now U.S. Pat. No. 7,239,434, issued on Jul. 3, 2007), which is a division of application Ser. No. 09/178,420, filed Oct. 26, 1998 (now U.S. Pat. No. 6,801,340, issued Oct. 5, 2004).

BACKGROUND OF THE INVENTION

1. Field of the Invention

The present invention relates to a data communication method for transmitting input data to a plurality of destinations using different transmission methods and a data communication apparatus which realizes the method.

2. Related Background Art

Conventionally, document data or the like, obtained by reading an original by using a scanner or the like, is transmitted to a remote facsimile apparatus via a telephone line, or transferred to a remote terminal via a network.

However, in case of transmitting a common document to various destinations with different data formats, procedures for format conversion for each destination designation have been very troublesome.

SUMMARY OF THE INVENTION

The present invention has as its object to provide a data communication apparatus and method which eliminate the above-described problems.

Further, another object of the present invention is to provide a data communication apparatus and method for transmitting common document data to a plurality of destinations based on different transmission methods by a simple operation.

Further, another object of the present invention is to provide a data communication apparatus and method for transmitting document data by different transmission methods to the same receiver.

Further, another object of the present invention is to provide a data communication apparatus and method for easily performing destination designation upon transmission to a desired designation.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of the contents of an address book in the document transmission apparatus of the embodiment;

FIG. 5 is a table showing an example of the contents of a destination list in the document transmission apparatus of the embodiment;

FIG. 6 is a table showing an example of the contents of a default data-transmission-format information base in the document transmission apparatus of the embodiment;

FIG. 7 is a table showing an example of the contents of classified destination list in the document transmission apparatus of the embodiment;

FIG. 9 is a flowchart showing an example of a first processing procedure by a document transmission controller;

FIG. 11 is a table showing an example of a memory map of a RAM in the embodiment;

FIG. 15 is an explanatory view showing an example of the contents of the address book;

FIG. 22 is an example of a script of the address book held in the directory server;

FIG. 24 is an example of a script of the address book including data for transmitting the notice of transmission;

FIG. 25 is a table showing keywords, ranges and formats used for selection condition expressions for detailed destination selection;

FIG. 27 is an example of a generated notice of transmission.

DETAILED DESCRIPTION OF THE PREFERRED EMBODIMENTS

First Embodiment

Hereinbelow, an embodiment of the present invention will now be described in detail in accordance with the accompanying drawings.

<Construction of Document Transmission Apparatus>

Figure 1:
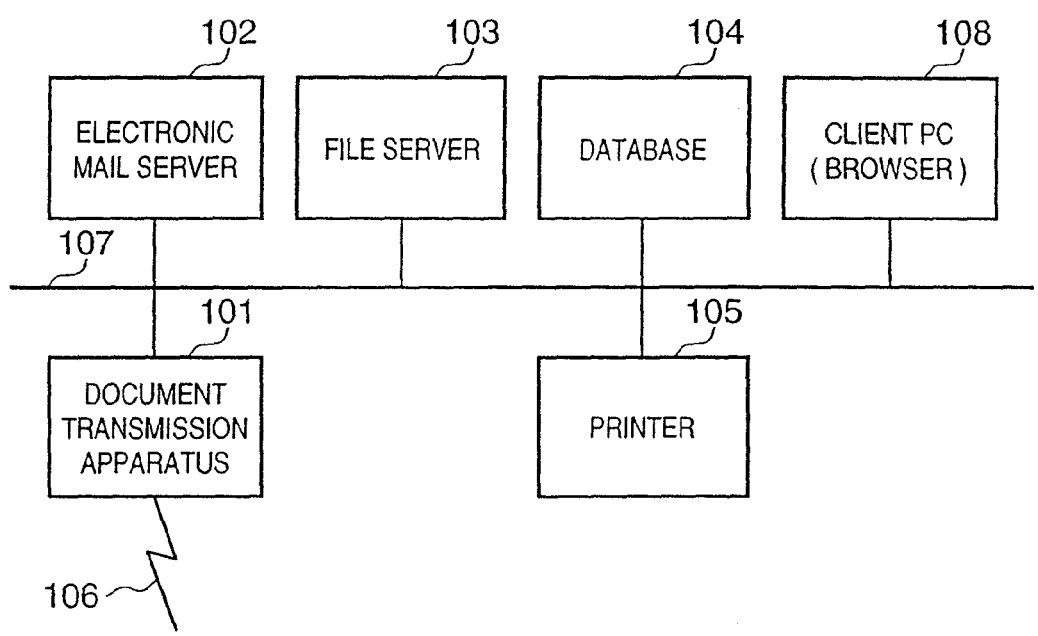
FIG. 1 is a block diagram showing an environment where a document transmission apparatus according to an embodiment of the present invention is connected.

FIG. 1 is a block diagram showing an example of a basic environment where an apparatus embodying the present invention operates. In FIG. 1, reference numeral 101 denotes a document transmission apparatus embodying the present invention. The document transmission apparatus 101 is connected to a network 107 and a telephone line 106. Numeral 102 denotes an electronic mail server connected to the network. The electronic mail server 102 supports a standard mail-transfer protocol SMTP (Simple Mail Transfer Protocol). Numeral 103 denotes a file server to operate a remote file system. The file server 103, connected to the network, supports the file transfer protocol FTP. Numeral 104 denotes a database connected to the network. The database 104 supports Salutation protocol. Numeral 105 denotes a printer connected to the network. The printer 105 supports a network printing protocol Ipr.

The above elements 102 to 105 respectively have a destination (address) according to respective transmission methods.

Numeral 108 denotes a client PC on which a browser supporting HTTP/HTML operates.

Note that in the following description, elements having the same reference numerals have the same functions.

Figure 2:
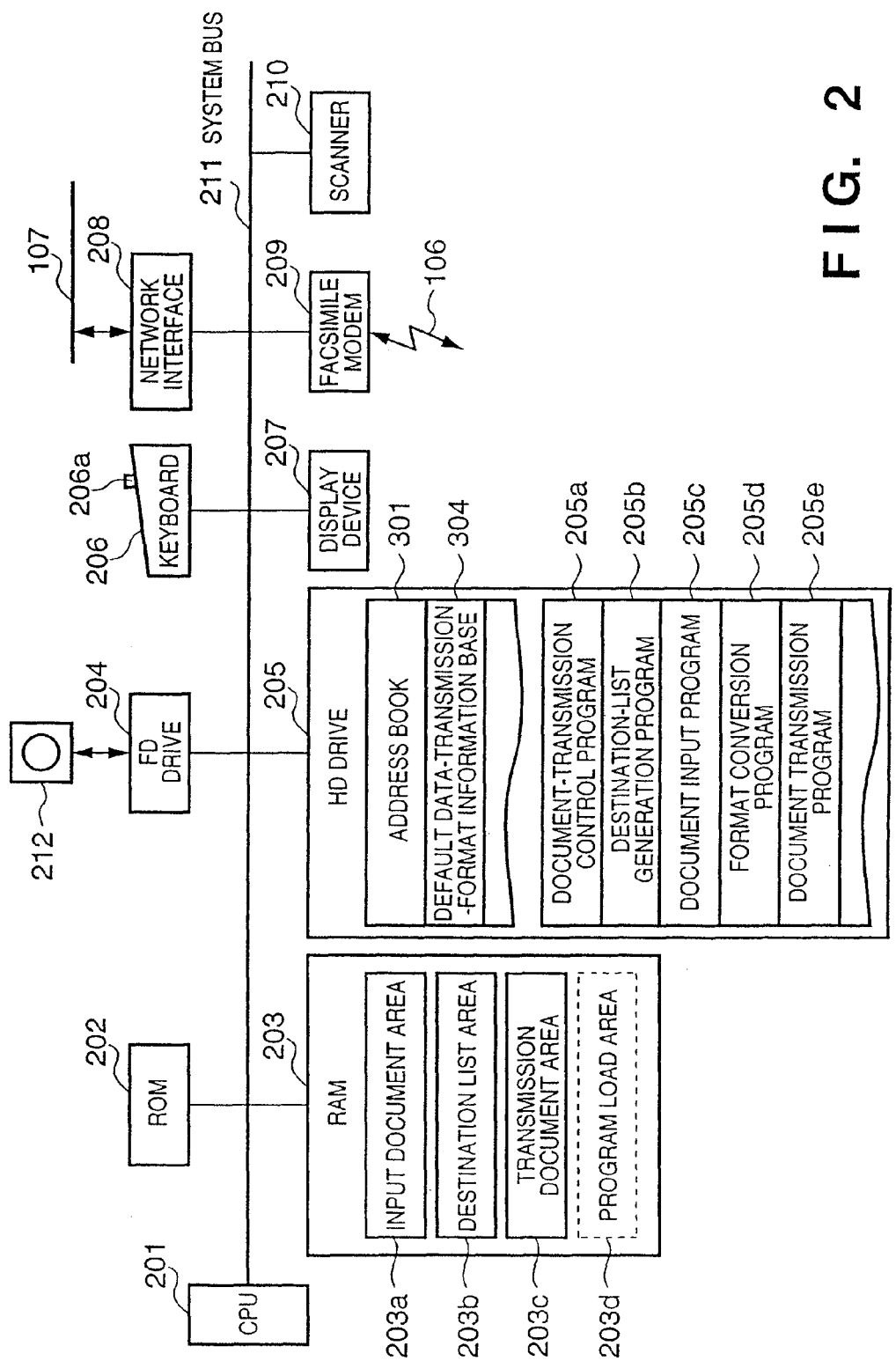
FIG. 2 is a block diagram showing an example of the construction of the document transmission apparatus of the embodiment.

FIG. 2 is a block diagram showing an example of a construction of the document transmission apparatus of the embodiment.

In FIG. 2, numeral 201 denotes a CPU (Central Processing Unit) for performing control and calculation and the like for the overall apparatus. Numeral 202 denotes a ROM (Read Only Memory) as a storage area for storing a system starting program, fixed information and the like. Numeral 203 denotes a RAM (Random Access Memory) as a data storage area without limitation of use, for loading and executing various programs and data in various processings as shown in the flowcharts to be described later. For example, the RAM 203 includes an input document area 203a for storing document data inputted from a scanner 210, a hard disk (HD) 205, a floppy disk (FD) 204 and the like, destination list area 203b for storing a generated destination list, transmission document area 203c for storing data for transmission generated from an input document through format conversion, and program load area 203d for loading programs from the HD 205 and the FD 204.

Numeral 204 denotes a floppy disk (FD) drive which stores a program and data into a floppy disk 212 in advance, and upon execution of the program, refers to or loads the program and data onto the RAM 203 as needed. Numeral 205 denotes a hard disk (HD) drive. A system or program is loaded from the HD drive 205 into the RAM 203 and started. The started system or program loads data or information stored in the HD drive 205 onto the RAM 203 as needed. The HD drive 205 is also used as a storage for temporarily storing document data read from the scanner. For example, input document data, an address book 301 and a default data-transmission-format information base 304 are stored in the HD drive 205. Further, programs such as an OS, a document-transmission control program 205a, a destination-list generation program 205b, document input program 205c, a format conversion program 205d and a document transmission program 205e, are held in the HD driver 205. The default data-transmission-format information base 304 and the format conversion program 205d include data and programs for conversion to existing various formats. The document transmission program 205e includes data and programs according to various transmission protocols. The data and programs may be stored in the FD 212. Note that the FD, the HD, a CD-ROM, an MO and the like are referred to as external storage devices.

Numeral 206 denotes a keyboard for inputting information to the CPU 201. One key on the keyboard is used as a Start key 206a for instruction of document data transmission. Numeral 207 denotes a display device such as a CRT for displaying data. Numeral 208 denotes a network interface. Connection with the network 107 is made via the interface 208. Numeral 209 denotes a facsimile modem. Connection with the telephone line 106 is made via the facsimile modem 209. Numeral 210 denotes a scanner for reading documents. Numeral 211 denotes a system bus which is a data path among the above-described elements.

The present apparatus operates by execution of a basic I/O program, the OS and a document transmission program module group by the CPU 201. The basic I/O program is written in the ROM 202, and the OS, in the HD drive 205. When the present system starts, the OS is read from the HD drive 205 into the RAM 203 by the IPL (Initial Program Loading) function of the basic I/O program, and thus the operation of the OS is started.

Figure 3:
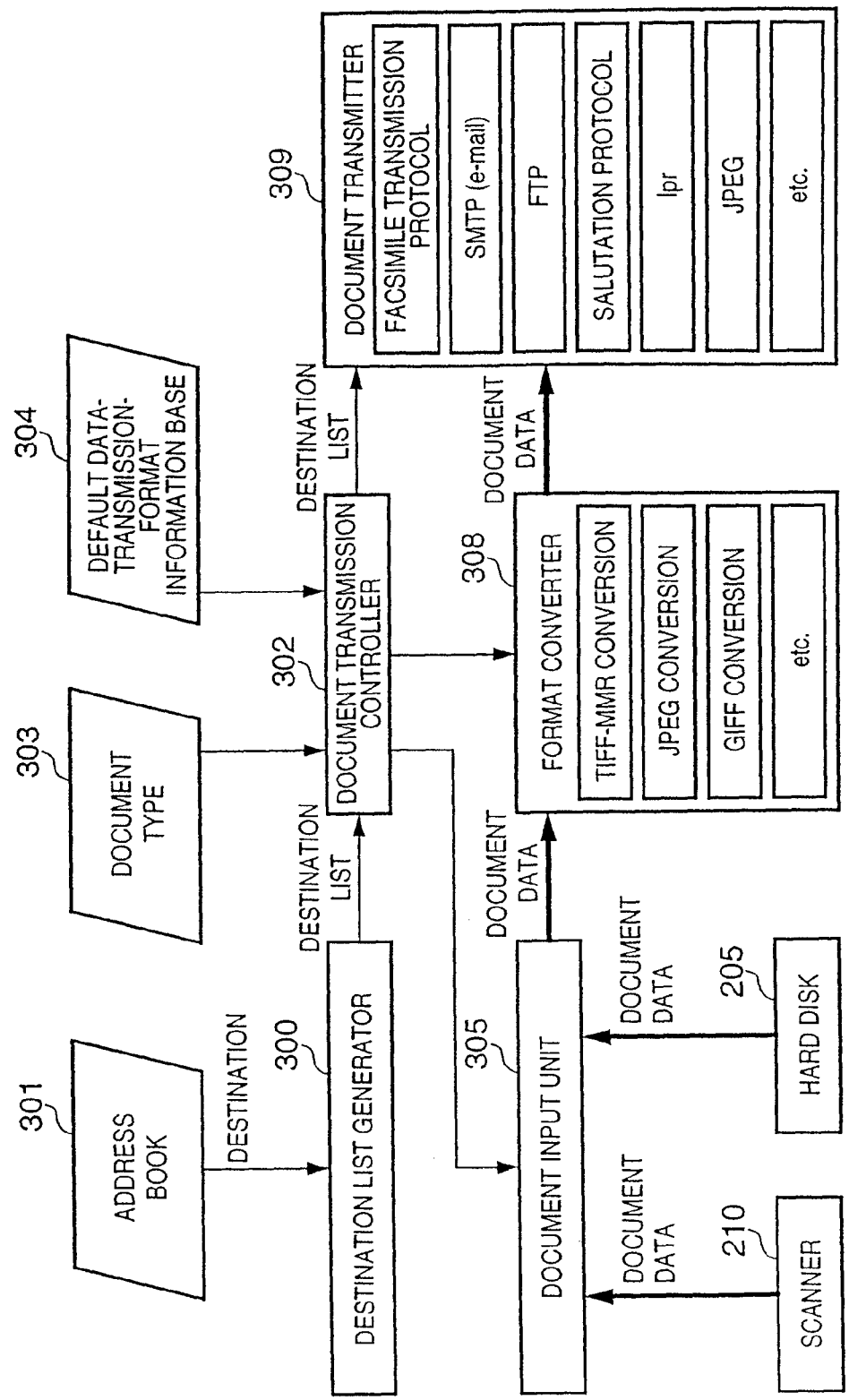
FIG. 3 is a block diagram showing an example of the functions of the document transmission apparatus of the embodiment.

FIG. 3 is a block diagram showing an example of the functions of the document transmission apparatus of the embodiment. Note that the functions of the respective functional elements are realized by loading programs from the HD drive 205 onto the RAM 203 and executing the programs by the CPU while utilizing the resources in the apparatus.

A destination list generator 300 generates a transmission destination list by copying items of designated destinations from the address book 301. As shown in FIG. 4, data transmission formats designated for respective destinations are described with transmission methods and destinations in the address book. Note that destinations may be inputted with the transmission methods from the keyboard 206.

FIG. 4 is a table showing an example of the contents of the address book 301.

In the address book, a destination address (401), a transmission method 402 such as e-mail, facsimile or Ipr, a data transmission format (text format) 403 used for document type, a format for monochrome document 404 and a format for color document 405, are described for each destination, as one set of information of the information base. In the case where a data transmission format is not described in the address book, a default format, determined by a transmission method designated in accordance with information in the default data-transmission-format information base 304, is used. The address book 301 is installed as a file existing on the HD drive 205, and it can be edited appropriately. The address book will be described in detail later.

When the Start key 206a is depressed, the destination list is sent to a document transmission controller 302. As shown in FIG. 5, destinations, transmission methods and data transmission formats are described in the destination list generated by picking up designated destinations from the address book 301.

FIG. 5 is a table showing an example of the contents of the destination list.

A destination address 501, a transmission method 502, a data transmission format used for document type (text format) 503, a format 504 for monochrome document and a format 505 for color document are described for each destination in the destination list.

The document transmission controller 302 classifies the destination list based on data transmission format in accordance with document type data 303 indicative of document types. If a data transmission format is not designated in the destination list, information from the default data-transmission-format information base 304 designating default data transmission formats for transmission methods is used.

FIG. 6 is a table showing an example of the contents of the default data-transmission-format information base 304.

A transmission method 601, a data transmission format (text format) 602 used for document type, a format 603 for a monochrome document and a format 604 for a color document are described for each transmission method, as one set of information of the information base, in the default data-transmission-format information base 304. The default data-transmission-format information base 304 is installed as a file existing on the HD drive 205, and can be appropriately edited in accordance with requirements from the system environment.

FIG. 7 is a table showing an example of the contents of the destination list when classification based on default data transmission format setting, data transmission format and communication method has been completed.

As shown in FIG. 7, destination addresses 701, transmission methods 702, and data transmission formats 705 used for document data type, are rearranged in accordance with the classification.

In this example, as a default data transmission format, LIPS is set for a destination "lmn.lkj.jp". Further, JPEG documents are collected in accordance with data-transmission-format based classification, and documents to be sent via e-mail are collected in accordance with communication-method based classification. Accordingly, the document transmission controller 302 instructs the format converter 308 on format conversion for each group of destinations having a common format, in accordance with the data-transmission-format based classification. Further, the document transmission controller 302 instructs the document transmitter 309 on transmission for each group of destinations according to a common communication method, in accordance with the communication-method based classification.

The document transmission controller 302 designates the document input source (the scanner 210 or the HD drive 205) of document data, and instructs a document input unit 305 to input the document data. The input document data is temporarily stored in the input document area 203a or the like by the document input unit 305. When the input of the document data has been completed, the document transmission controller 302 provides a data transmission format to the format converter 308 in accordance with the classified destination list, and instructs the format converter 308 to perform format conversion. The format converter 308 converts the input document data to data in the designated data transmission format.

When the document data has been converted, the document transmission controller 302 transfers the document data from the format converter 308 to the document transmitter 309. The document transmitter 309 is provided with a destination list of destinations using the converted data transmission format.

Figure 8A:
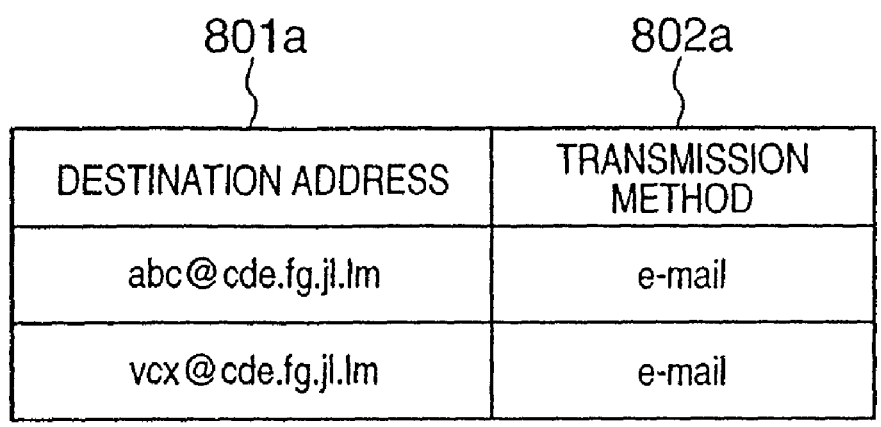
FIGS. 8A and 8B are tables showing examples of the contents of a destination list transmitted to a document transmitter in the document transmission apparatus of the embodiment.
Figure 8B:
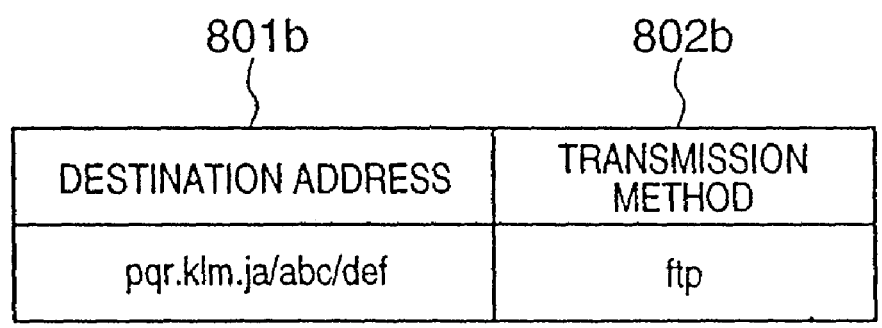

FIGS. 8A and 8B show examples of the destination list provided from the classified destination list as shown in FIG. 7 to the document transmitter 309.

FIG. 8A shows a designation list instructing the document transmitter 309 to send the document data converted by the format converter 308 in correspondence with the JPEG format to two receivers by e-mail transmission. FIG. 8B shows a destination list instructing the document transmitter 309 to file-transmit the document data converted by the format converter 308 in correspondence with the JPEG format to one receiver.

The document transmitter 309 transmits the input document data to the designated destination by the designated transmission method. When the document transmission to all the destinations included in the destination list has been completed, the document transmission controller 302 instructs the document input unit 305 and the format converter 308 to delete the temporarily stored document data.

<Processing Procedure of Document Transmission Apparatus>

(First Processing Procedure)

FIG. 9 is a flowchart showing the operation of the document transmission controller when the Start key 206a is depressed and the destination list and the document data types are provided to the document transmission controller 302.

At step S901, one input destination is read. At step S902, it is determined whether or not a data transmission format corresponding to the type of the designated document data is designated, i.e., whether or not a data transmission format is described in correspondence with the designated destination. If a data transmission format is not designated, the process proceeds to step S903, at which a data transmission format is specified from information of the default data-transmission-format information base 304 and the type of the designated document data, and the data transmission format is written in the destination list. If it is determined at step S904 that the next destination exists, the process returns to step S901 at which the next destination is read, and steps S901 to S904 are repeated with respect to all the destinations in the destination list.

Next, at step S905, the destinations are classified with the data transmission formats of designated document data types as keys (e.g., Format1, Format2 and the like). Further, at step S906, a plurality of destinations using the same data transmission format are classified with transmission methods as keys (in FIG. 7, JPEG data transmission format destinations are classified into "e-mail" destinations and a "ftp" destination).

At step S907, the document input unit 305 is instructed to input the document data, and at step S908, the completion of document data input is waited. The input document data is temporarily stored in the document input unit (the input document area 203a).

At step S909, a data transmission format necessary for the first destination in the classified destination list is designated, and the format converter 308 is instructed to perform format conversion on the input document data in correspondence with the designated data transmission format (in FIG. 7, the first designated format is JPEG, and the next format is TIFF-MMR). The converted document data is temporarily stored in the format converter (transmission document area 203c). At step S910, it is determined whether or not the format of the converted document data is the last format in the destination list classified at step S906. If it is the last format, the deletion of the document data temporarily stored in the document input unit is instructed at step S911.

Next, at step S912, a destination list (See FIG. 8A) of destinations using the first transmission method designated at step S909 is generated from the destination list classified at step S906. At step S913, the document transmitter 309 is instructed to transmit the document data held in the format converter 308 with the destination list generated at step S912 and the transmission methods as parameters. At step S914, if a plurality of document data of the same data transmission format exist, the process returns to step S912, at which a destination list (See FIG. 8B) of destinations using the next transmission method designated at step S909 is generated. Thus, steps S912 to S914 are repeated with respect to all the transmission methods for transmitting the document data in the data transmission formats designated at step S909.

At step S915, if the next destination exists, the process returns to step S909, at which the next data transmission format is designated. Thus, steps S909 to S915 are repeated with respect to all the data transmission formats in the classified destination list.

When the transmission with respect to all the destinations has been completed, deletion of the document data temporarily stored in the format converter is instructed at step S916, and the document data transmission ends.

(Second Processing Procedure)

In the above-described first processing procedure, the destination list is classified in accordance with document type data, then the document data is inputted and sequentially converted to data of necessary data transmission formats for transmission. However, as long as the format converter 308 and the document transmitter 309 can utilize resources necessary for operation, such as the RAM 203, the hard disk 205, the network interface 208 and the facsimile modem 209, further efficient document transmission is possible by parallel operation.

Next, the second processing procedure will be described with reference to FIGS. 10A, 10B and 10C.

Figure 10A:
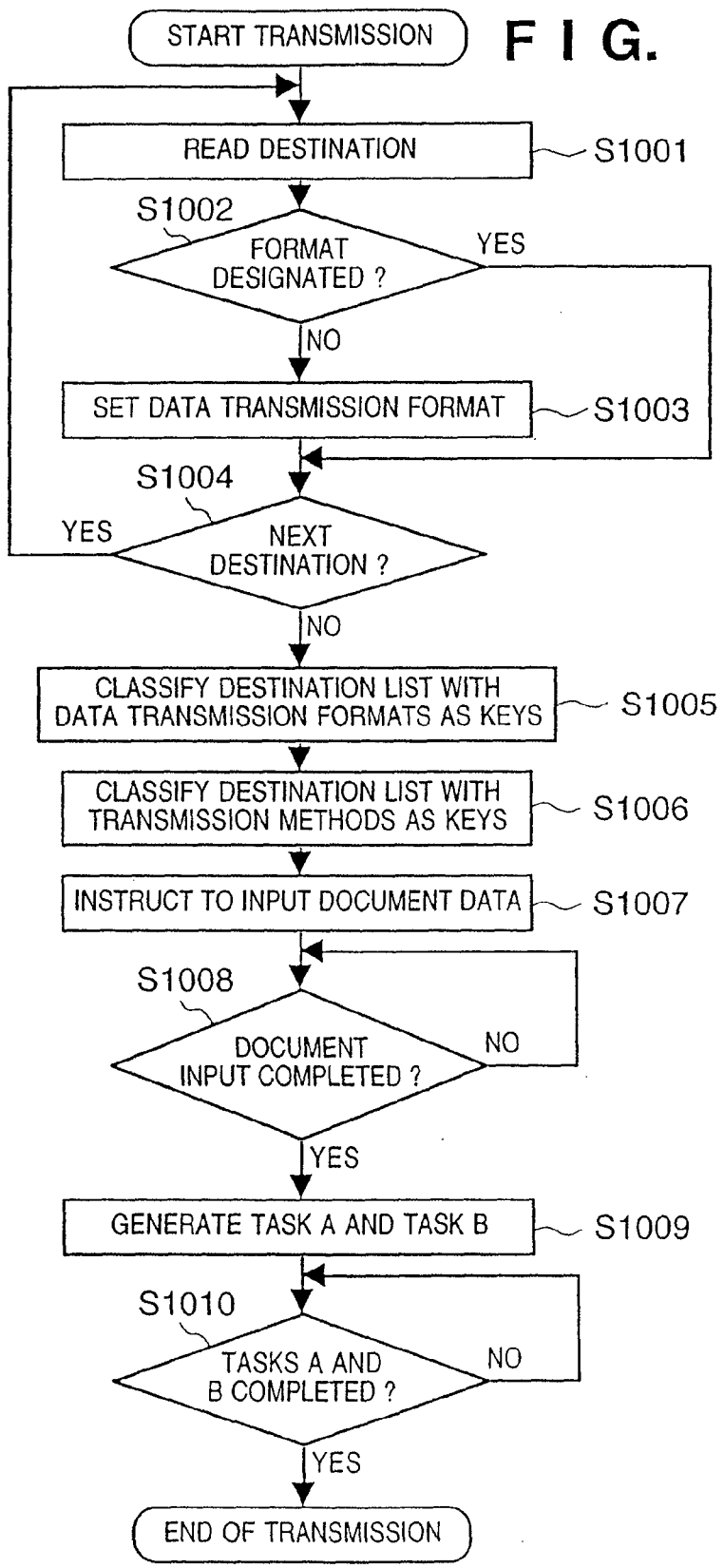
FIGS. 10A, 10B and 10C are flowcharts showing an example of a second processing procedure by the document transmission controller.
Figure 10B:
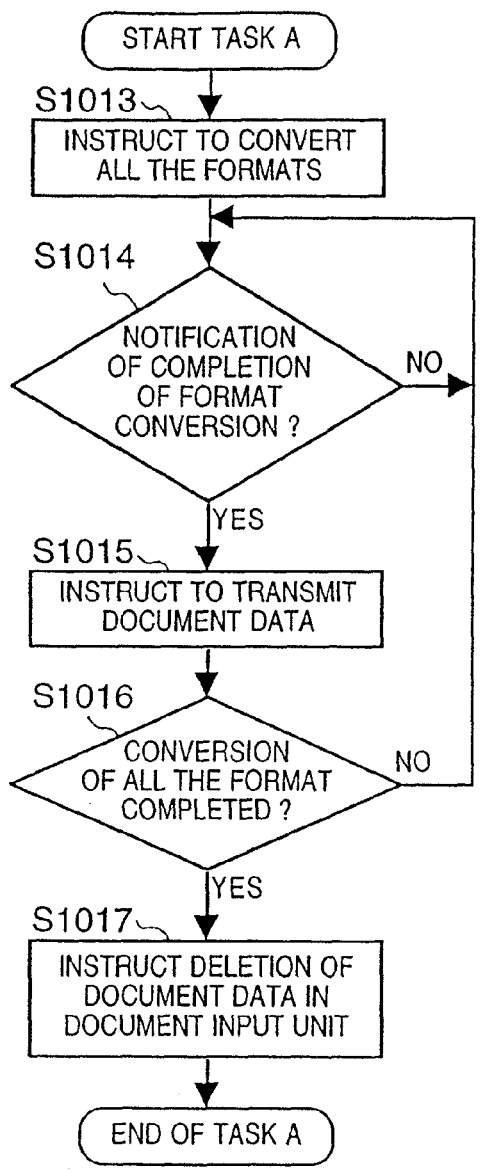
Figure 10C:
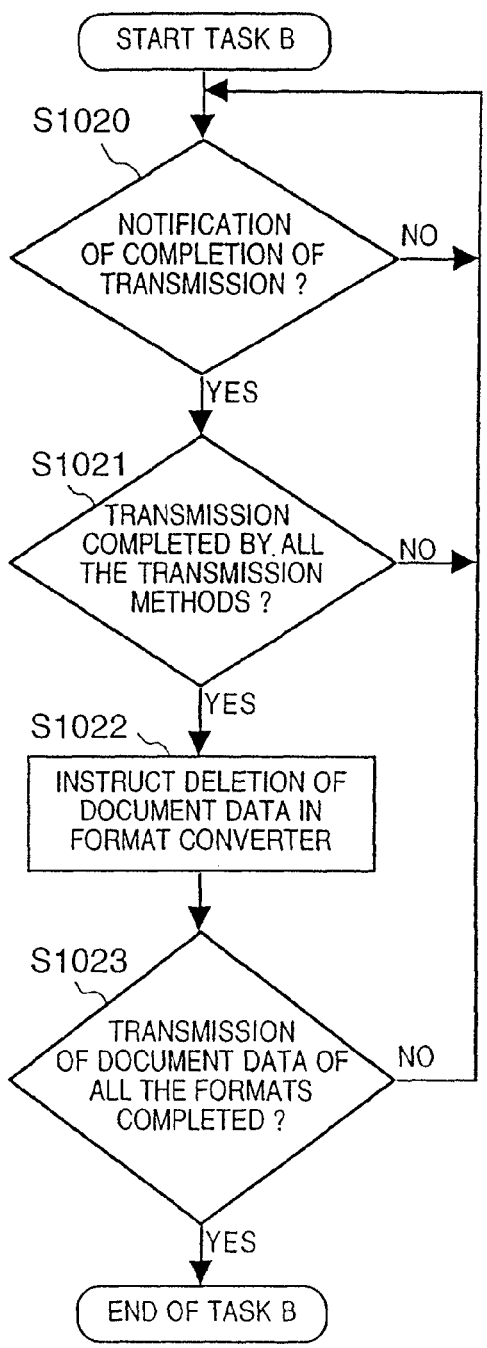

FIGS. 10A, 10B and 10C are flowcharts showing the operation of the document transmission controller 302 when the Start key 206a has been depressed and the destination list and the document data type have been provided to the document transmission controller 302.

At step S1001, an input destination is read. At step S1002, similarly to the above-described step S902, it is determined whether or not a data transmission format corresponding to the type of the designated document data is designated, i.e., whether or not a data transmission format is described in correspondence with the designated destination. If a data transmission format is not designated, the process proceeds to step S1003, at which a data transmission format is specified from information of the default data-transmission-format information base 304 and the type of the designated document data, and the data transmission format is written in the destination list. If it is determined at step S1004 that a next destination exists, the process returns to step S1001 at which the next destination is read, and steps S1001 to S1004 are repeated with respect to all the destinations in the destination list.

Next, at step S1005, the destinations are classified in accordance with the data transmission formats of designated document data types as keys. Further, at step S1006, a plurality of destinations using the same data transmission format are classified with transmission methods as keys. At step S1007, the document input unit 305 is instructed to input the document data, and at step S1008, the completion of document data input is awaited. The input document data is temporarily stored in the document input unit.

Thereafter, at step S1009, a task A for managing format conversion and a task B for managing transmission of converted document data are generated, and the two tasks are operated in parallel. At step S1010, the completion of the task A and the task B is awaited. When these tasks have been completed, the document transmission ends. Note that the task A and the task B are provided with the destination list classified at step S1006 as parameter.

In task A, first, at step 1013, the format converter 308 is instructed to perform format conversion on the document data in correspondence with all the data transmission formats included in the destination list classified at step S1006. The format converter 308 performs conversion of as many data transmission formats as possible in parallel, by utilizing the resources necessary for the operation such as the RAM 203 and the HD drive 205, in parallel, as much as possible. At step S1014, the document transmission controller 302 waits for a notification of the completion of format conversion from the format converter 308, and at step S1015, instructs the document transmitter 309 to transmit the document data converted at step S1015, with the destinations using the data transmission format and transmission methods as parameters.

The document transmitter 309 also performs document transmission, as many as possible in parallel, by utilizing the resources such as the RAM 203, the HD drive 205, the network interface 208 and the facsimile modem 209 in parallel as much as possible. At step S1016, it is determined whether or not notifications of the completion of format conversion with respect to all the data transmission formats included in the provided destination list have been sent from the format converter 308. If all the notifications of the completion of the conversions have been received, deletion of the document data held in the document input unit is instructed at step S1017. Then the processing of task A ends.

On the other hand, in the task B, a notification of the completion of document transmission from the document transmitter 309 is awaited at step S1020. The notification of the completion of document transmission includes a data transmission format and a transmission method. At step S1021, it is determined whether or not document data which has been transmitted in all the transmission methods exists in the destination list. If such document data exists, the format converter 308 is instructed to delete the document data of the data transmission format at step S1022. At step S1023, it is determined whether or not deletion has been instructed with respect to all the data transmission formats. If YES, the operation of task B ends.

Note that the present embodiment may be realized by encoding and storing the program of the flowchart of FIG. 9 or FIGS. 10A, 10B and 10C and into a storage medium, then loading the program from the storage medium onto a general computer, and executing the program.

Figure 12:
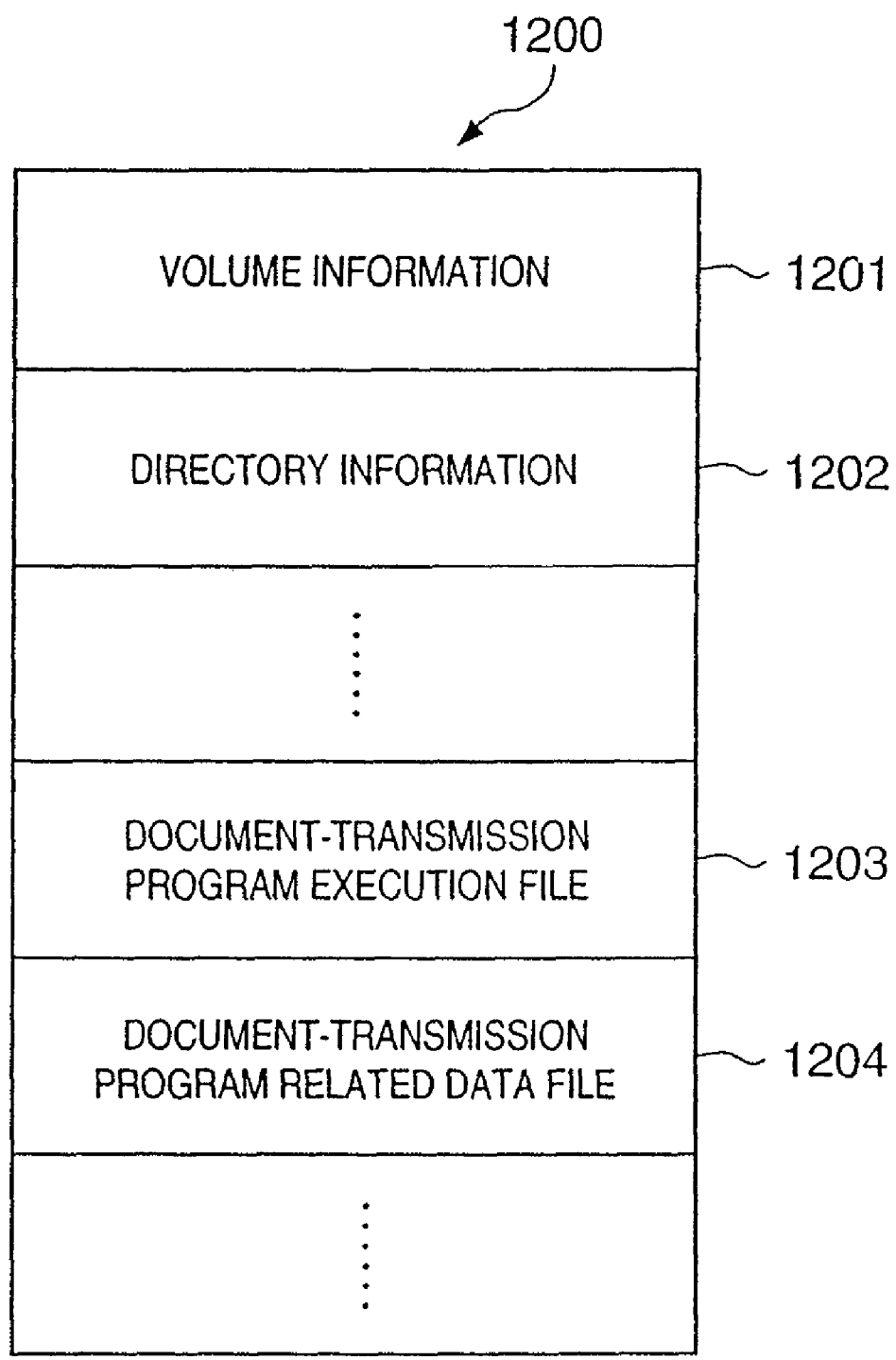
FIG. 12 is a table showing an example of a program structure of a storage medium in the embodiment.

In this example, the document transmission program module group is a program code based on the flowchart of FIG. 9 or FIGS. 10A, 10B and 10C in accordance with the block diagram of FIG. 3. The program module group is stored in, e.g., the storage medium (FD) 212. FIG. 12 shows the structure of the stored contents in the storage medium.

Figure 13:
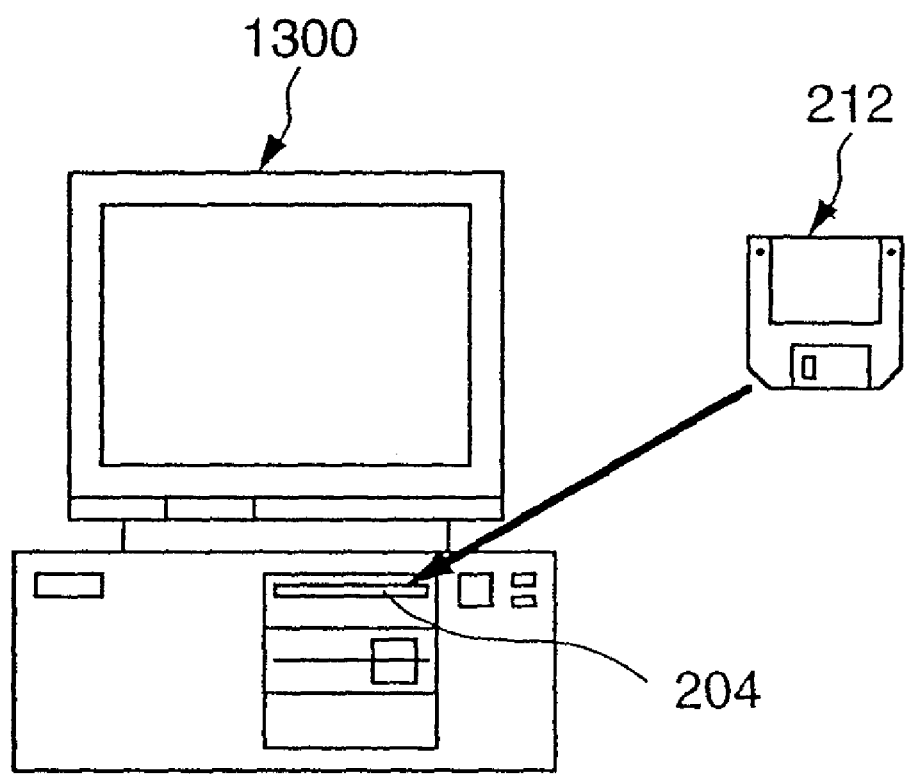
FIG. 13 is an explanatory view showing program loading in the embodiment.

In FIG. 13, a document-transmission program execution file 1203 and its related data 1204 are stored in the storage medium (FD) 212 and loaded via the FD drive 204 onto a computer system 1300. When the FD 212 is inserted into the FD drive 204, the document-transmission program execution file 1203 and the related data 1204 are read from the FD 212 and loaded onto the RAM 203 and become operative under the control of an OS 1102 and a basic I/O program 1101.

FIG. 11 is a table showing an example of a memory map of the RAM 203 in the embodiment where the document transmission program is loaded and is executable. The RAM 203 has a structure comprising areas for the basic I/O program 1101, the OS 1102, a document-transmission program module group 1103, the related data 1104, and a work area 1105.

In the above example, the document-transmission program execution file 1203 and the related data 1204 are directly loaded from the storage medium (FD) 212 onto the RAM 203 and executed; however, it may be arranged such that the document-transmission program execution file 1203 and the related data 1204 are temporarily stored (installed) into the HD 205 from the storage medium (FD) 212, and when the document-transmission program is operated, the stored file 1203 and the related data 1204 are loaded from the HD 205 onto the RAM 203.

Further, the storage medium for storing the document transmission program may be a CD-ROM, an IC memory card and the like other than the FD 212. Further, it may be arranged such that the document-transmission program module group is stored in the ROM 202, and directly executed by the CPU 201.

Accordingly, the above-described embodiment provides a document data transmission method for transmitting a document to a plurality of receivers by a plurality of transmission methods such as an e-mail system, a remote file system, a remote data base, a remote printer and the like, connected via a network, and a plurality of receivers connected via a telephone line, by instructing transmission only once, and a document transmission apparatus realizing the method.

That is, document data can be transmitted in appropriate data transmission format and transmission method for each transmission method, transmission destination and document type. Further, document data can be efficiently transmitted to a plurality of destinations requiring a plurality of data transmission formats.

<Address Book>

Next, management, editing and use of the address book used in transmission to various destinations as above will be described.

Figure 14:
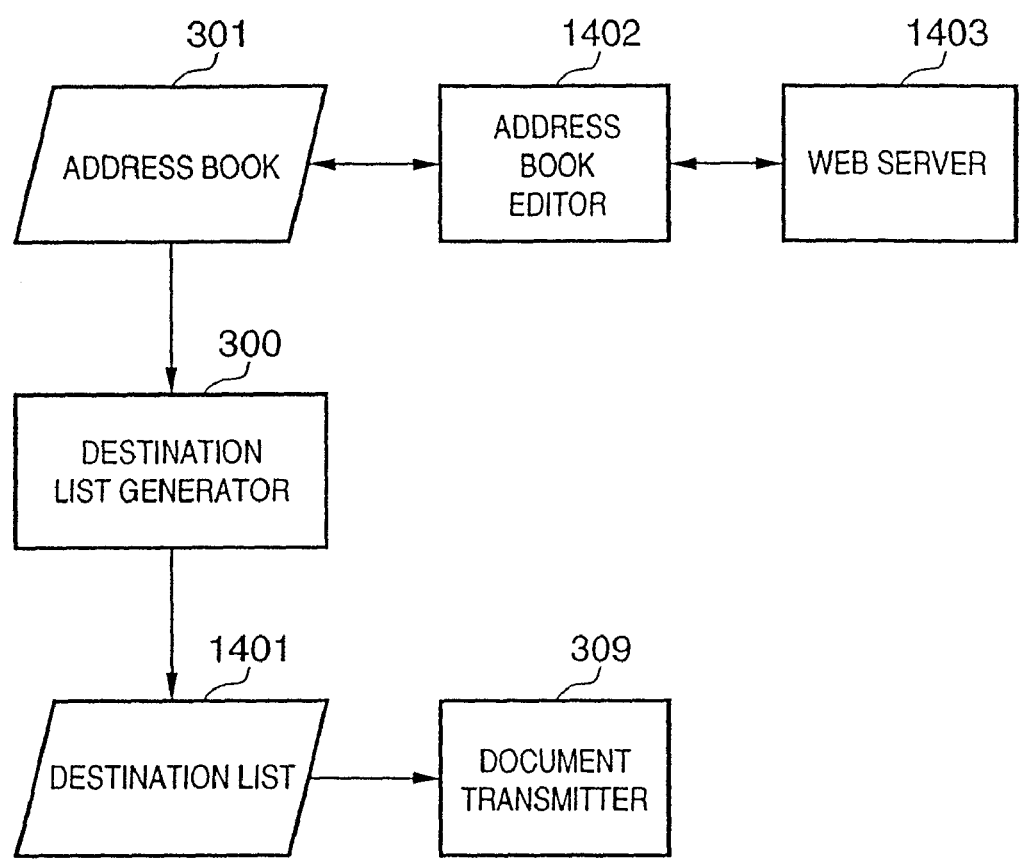
FIG. 14 is a block diagram showing the flow of address-book editing processing.

FIG. 14 is a block diagram showing the flow of address-book editing processing.

Figure 16:
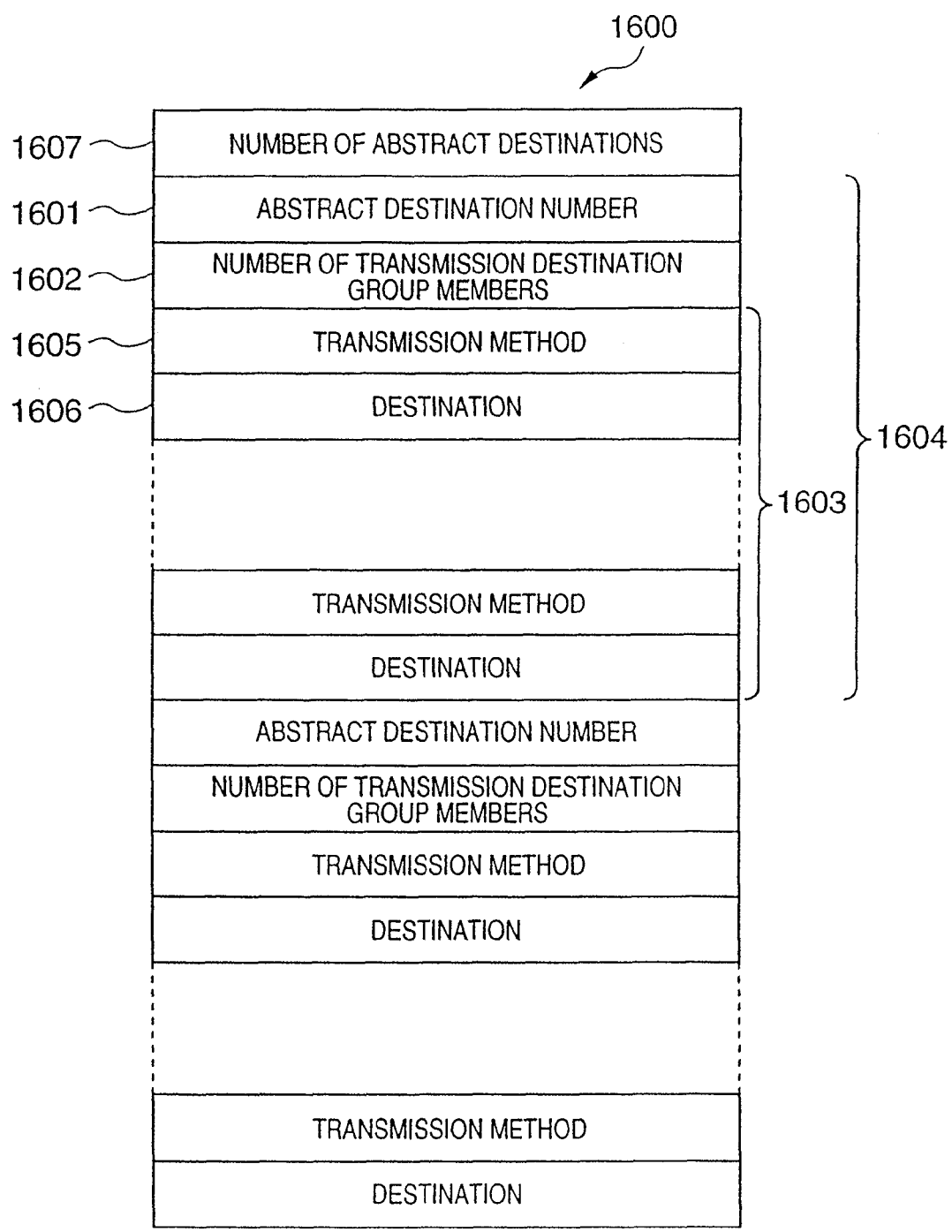
FIG. 16 is a table showing an example of data contents of the destination list.

The destination list generator 300 generates a destination list 1401 by copying designated items from the address book 301. As shown in FIG. 15, the address book 301, held on the hard disk 205, includes abstract destinations with a group of detailed destinations and a group of transmission destinations. As shown in FIG. 16, the destination list 1401, held on the RAM 203, includes a group of detailed destinations and the like. The address book editor 1402 displays the contents of the address book on the display device 207, and the contents are edited from the keyboard 206. The address book editor 1402 further converts the contents of the address book into HTML format data, and displays the data via a Web server 1403 on a browser which operates on the client PC 108 connected to an external device via the network. The Web server 1403 transmits the address book in the HTML format converted by the address book editor 1402 to the client PC 108 on which the browser operates, by the HTTP protocol. Further, the Web server 1403 transmits an address-book editing instruction transmitted from the browser operating on the client PC 108 by the HTTP protocol to the address book editor 1402, and the address book editor 1402 edits the address book 301 in accordance with the instruction.

When a predetermined key on the keyboard 206 is depressed, the destination list 1401 is sent to the document transmitter 309. The document transmitter 309 transmits documents in accordance with destinations and transmission methods described in the destination list 1401.

FIG. 15 shows an examples of the contents of the address book 301.

The address book 301 comprises two types of files existing on the HD 205. In one abstract destination file 1501, an abstract destination name (1502) and an abstract destination number (1503) are uniquely allotted to each abstract destination within the abstract destination file. A detailed destination file 1505 exists for each abstract destination number and shows members constituting the abstract destination. In the detailed destination file 1505, the file name of the detailed destination file is generated from the abstract destination number 1503, such that the detailed destination file can be uniquely designated from the abstract destination. The detailed destination file 1505 has transmission methods 1506, destinations 1507 in accordance with the transmission methods, and transmission-destination member flags 1508, each indicating whether or not the destination is a member of a transmission destination group. If the value of the transmission destination member flag 1508 is "1", the destination is a member of the transmission destination group, while if the value is "0", the destination is not a member of the transmission destination group.

As described above, the address book editor 1402 converts the contents of the abstract destination file 1501 and the detailed destination files 1505 into HTML format data, and displays the data via the Web server 1403 on the browser which operates on the client PC 108 connected to the external device via the network. The Web server 1403 transmits the address book in the HTML format converted by the address book editor 1402 to the client PC 108, on which the browser operates, by the HTTP protocol. The browser operating on the client PC 108 modifies and displays the address book of the HTML format. The Web server 1403 transmits an address-book editing instruction transmitted from the browser operating on the client PC 108 by the HTTP protocol to the address book editor 1402. The address book editor 1402 edits the contents of the abstract destination file 1501 or the contents of the detailed destination file 1505 in accordance with the instruction.

FIG. 16 shows data for the contents of the destination list 1401.

A destination list 1600 is generated in the RAM 203 by the destination list generator 300. FIG. 16 shows the memory map of the destination list generated in the RAM 203.

As shown in FIG. 16, the number of abstract destinations, an abstract destination number (1601), the number of transmission destination group members (1602) and a transmission destination group (1603), are stored as one set (1604), and a plurality of sets (1604) are stored in the destination list 1600. The abstract destination number (1601) corresponds to the abstract destination number (1503) in the abstract destination file of the address book. Each member of the transmission destination group holds a transmission method (1605) and a destination (1606) according to the transmission method.

Figure 17:
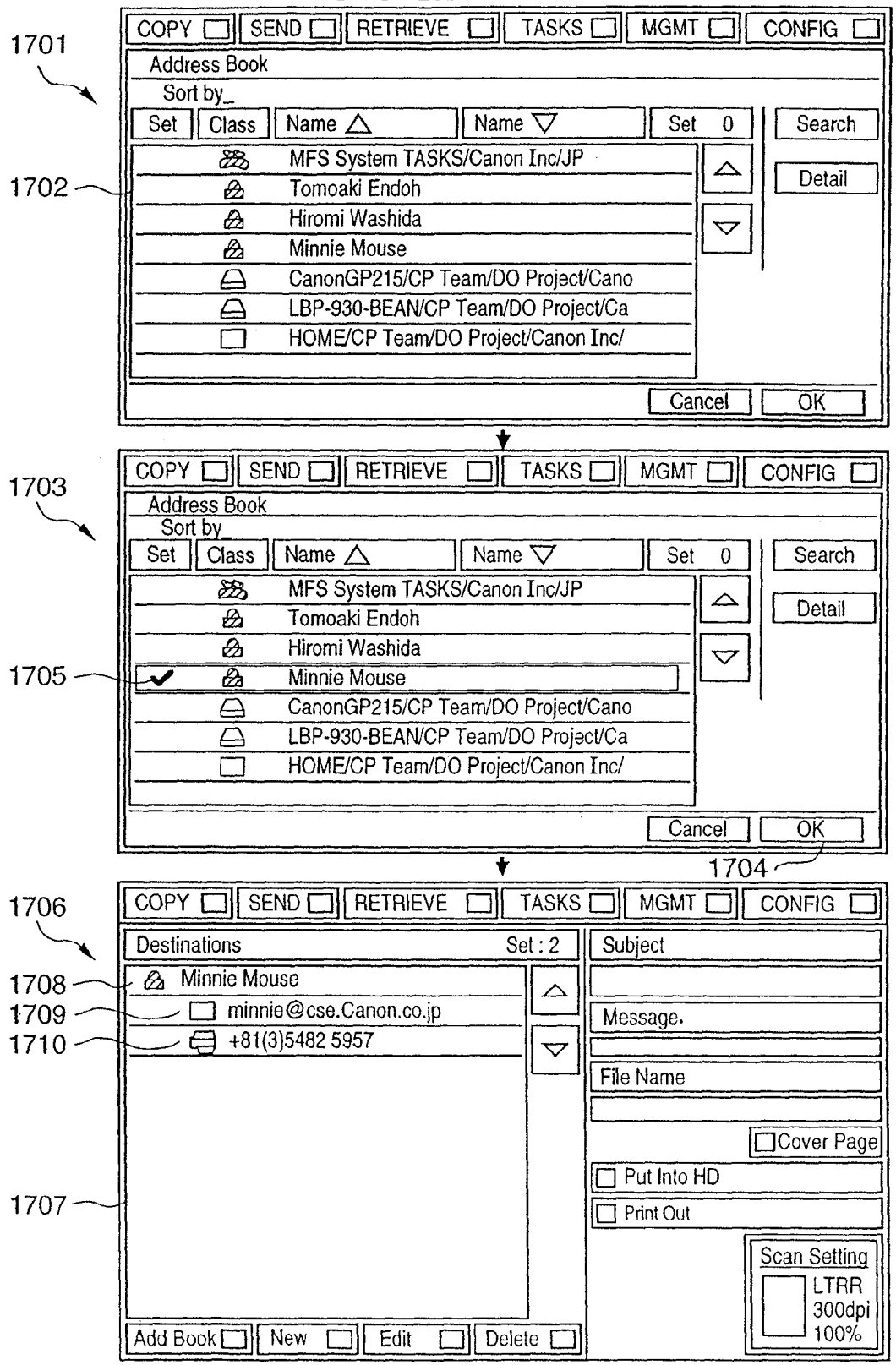
FIG. 17 is an explanatory view showing images for destination-list setting processing.

FIG. 17 shows images of a user interface when detailed destinations are copied into the destination list 1401 in accordance with designation of an abstract destination in the address book 301.

In an image 1701, the contents of the address book 301 are displayed on the display device 207. An abstract destination name (1502) in the abstract destination file 1501 is displayed in a destination display area 1702. In an image 1703, one abstract destination is selected from the image 1701. Numeral 1705 denotes the selected abstract destination. The detailed destinations having the transmission destination member flags with values "1" in the detailed destination file 1505, generated from the number of the selected abstract destination, are copied into the destination list 1401 by depressing an OK key 1704 in the image 1703. In an image 1706, the destination list 1401 is displayed on the display device 207. In the image 1706, 1707 denotes a destination list display area; 1708, an abstract destination name; and 1709 and 1710, detailed destinations as members of a transmission destination group (1603). In the image 1706, the transmission methods of the detailed destinations are displayed in the form of icons.

Figure 18:
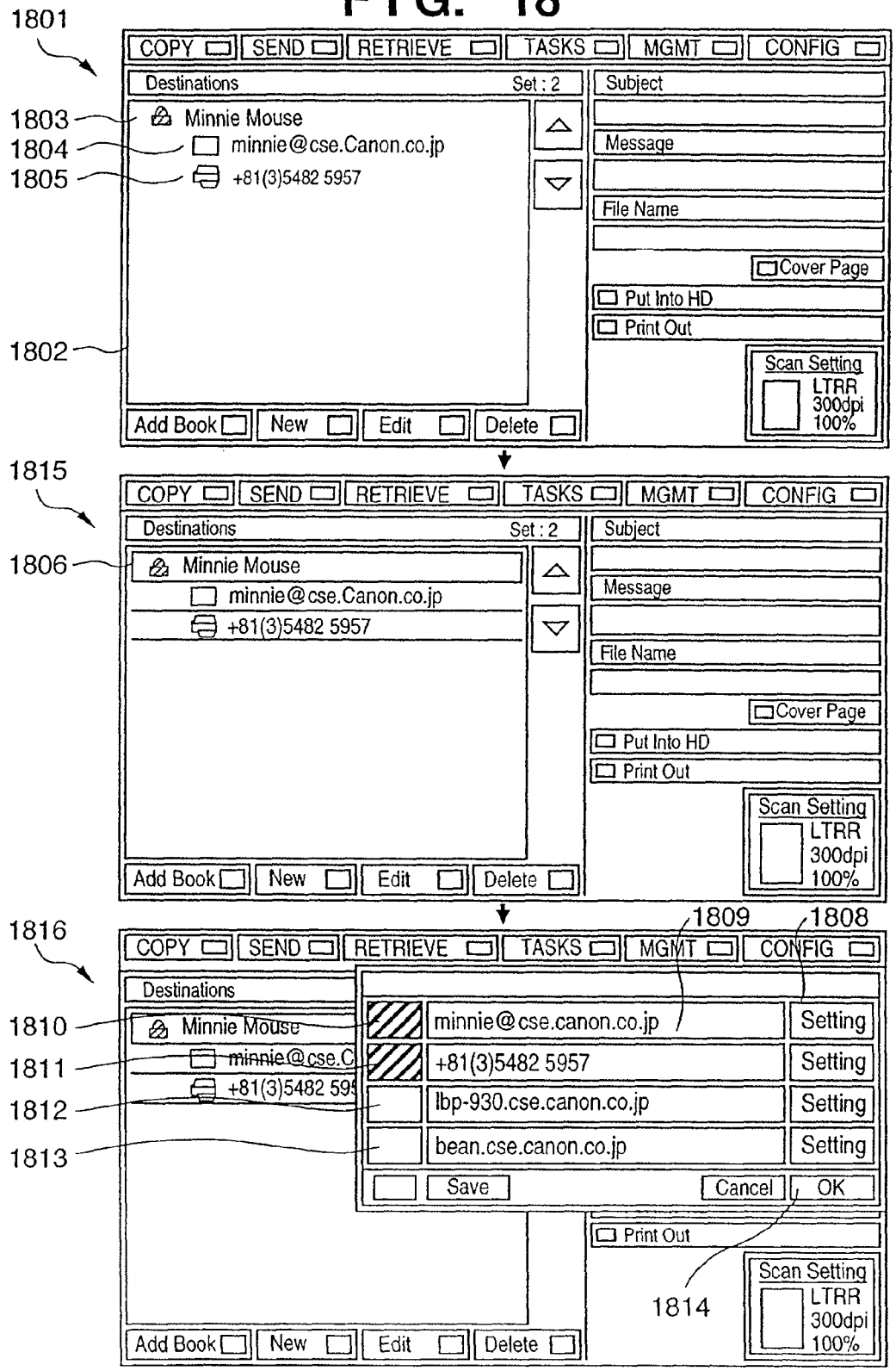
FIG. 18 is an explanatory view showing images of detailed destination display dialog for changing the destination list.

FIG. 18 shows images of detailed destination display dialog as a user interface used for displaying the contents of detailed destination upon addition/change/deletion of detailed destination within the destination list.

In an image 1801, the destination list 1401 is displayed on the display device 207. In the image 1801, numeral 1802 denotes a destination-list display area; 1803, an abstract destination; and 1804 and 1805, detailed destinations as members of the transmission destination group 1603. In an image 1815, one abstract destination is selected from the image 1801. Numeral 1806 denotes the selected abstract destination. In the image 1815, a detailed destination display dialog 1808 is displayed by depressing an Edit key 1807. In an image 1816, the detailed destination display dialog is displayed. The detailed destination display dialog displays all the transmission methods of the members on the selected abstract destination on the address book with destinations. Among the displayed destinations, regarding a detailed destination which is a member of the transmission destination group on the destination list 1401, the color of key indicating the transmission method is changed. In the example of the image 1816, the color of keys 1810 and 1811 of the transmission methods is changed, which indicates that these detailed destinations are members of the transmission destination group.

Figure 19:
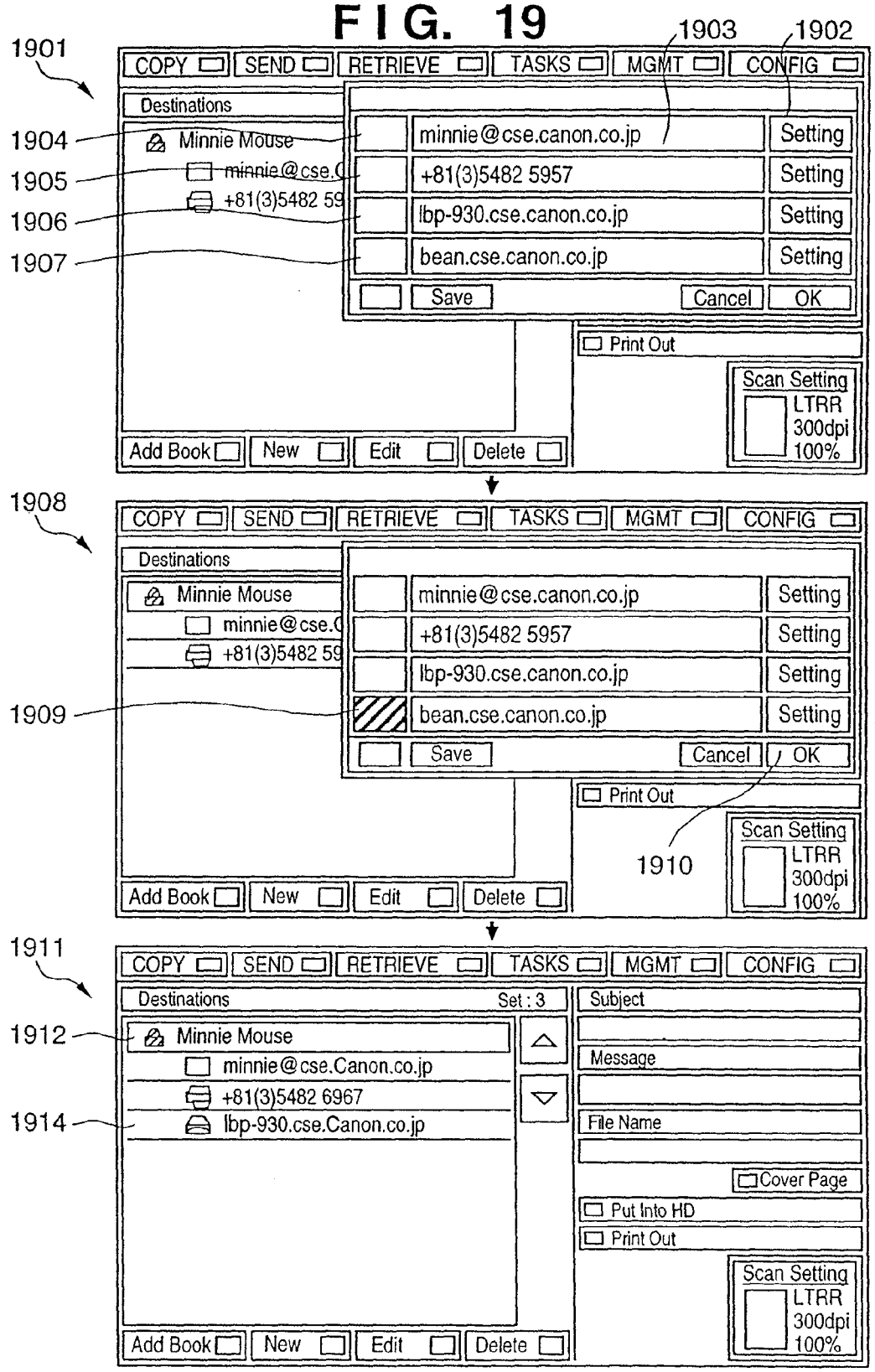
FIG. 19 is an explanatory view showing images for adding a member to a transmission destination group.

FIG. 19 shows images of detailed destination display dialog as a user interface used for adding a member to the transmission destination group on the destination list.

An image 1901 shows the same state as that of the image 1816. In the image 1901, a member is added to the transmission destination group on the destination list 1401 by depressing a transmission method key 1906 of a detailed destination which is not a member of the transmission destination group. In an image 1908, the member has been added. In the image 1908, the color of the transmission method key is changed to a color (1909) indicating that the destination is added to the transmission destination group. Each transmission method key is a toggle key such that addition/deletion of member to/from the transmission destination group can be changed at each depression. In the state of the image 1908, when an OK key 1910 on the detailed destination display dialog is depressed, the addition of the member to the transmission destination group on the destination list is determined, and the displayed content in the destination list display area is changed. In an image 1911, the addition of the member to the transmission destination group on the destination list has been determined. In the image 1911, numeral 1912 denotes an abstract destination; and 1914, the added detailed destination.

Further, the contents of the detailed destinations can be changed by editing the contents of the destinations 1903 on the detailed destination display dialog 1902.

The detailed destination display dialog is closed by depressing the OK key 1910 on the detailed destination display dialog, and the change of transmission destination is reflected on the destination list display area.

Figure 20:
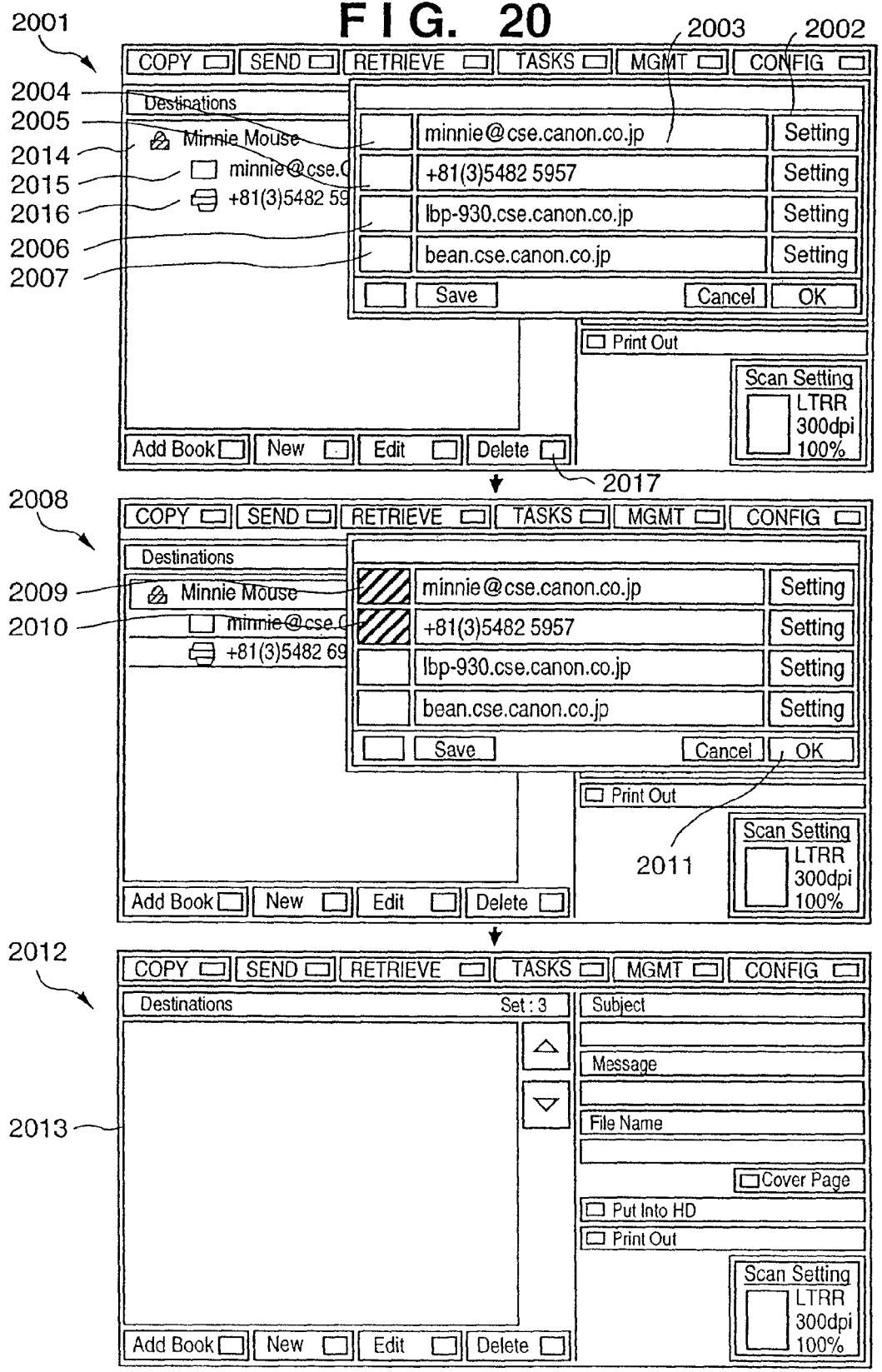
FIG. 20 is an explanatory view showing images for deleting a member from the transmission destination group.

FIG. 20 shows images of detailed destination display dialog as user interface used for deleting a member from the transmission destination group on the destination list.

An image 2001 shows the same state as that of the image 1816. In FIG. 20, transmission method keys 2009 and 2010 of detailed destinations as current members of the transmission destination group on the image 1901 are depressed, and the members are deleted from the transmission destination group on the destination list 1401. In an image 2008, the members are deleted. In the image 2008, the color of the transmission method keys 2009 and 2010 of the deleted members is changed to a color indicating that these members are deleted.

In the state of the image 2008, the deletion of the members from the transmission destination group on the destination list is determined by depressing an OK key 2011 on the detailed destination display dialog, and the displayed content of the destination list display area is changed. In an image 2012, the members have been deleted from the transmission destination group on the destination list.

As shown in the image 2012, when all the detailed addresses are deleted from the transmission destination group 1603 and the OK key 2011 is depressed on the detailed destination dialog 2002, all the detailed destinations are deleted from the destination list display area 2013. At the same time, the destination list generator 300 determines whether or not the transmission destination group 1603 edited on the destination list 1600 is an empty set. If the transmission destination group is an empty set, the destination list generator 300 deletes the abstract destination set 1604 from the destination list 1600, and updates the destination list display area. As a result, as shown in the image 2012, the abstract destinations are deleted from the destination list display area.

Further, in the image 2001, if an abstract destination 2014 is selected and a Delete key 2017 is depressed, the corresponding abstract destination set 1604 can be deleted. Further, if a detailed destination 2015 is selected and the Delete key 2017 is depressed, the selected detailed destination is deleted. In this case, if all the members 2015 and 2016 of the transmission destination group are selected and the Delete key 2017 is depressed, the destination list generator 300 determines whether or not the transmission destination group 1603 edited on the destination list 1600 is an empty set. If the transmission destination group is an empty set, the destination list generator 300 deletes the abstract destination set 1604 from the destination list 1600, and updates the destination list display area. As a result, as shown in the image 2012, the abstract destinations are deleted from the destination list display area.

In the above description, the address book comprises one abstract destination setting file and a plurality of detailed destination setting files; however, the same logical structure as the address book in the description may be realized as a data base managed by a data-base management system by an external device on the network.

Further, the address book may be realized as directory information managed in a directory server. The processing in this case will be described with reference to FIG. 21.

Figure 21:
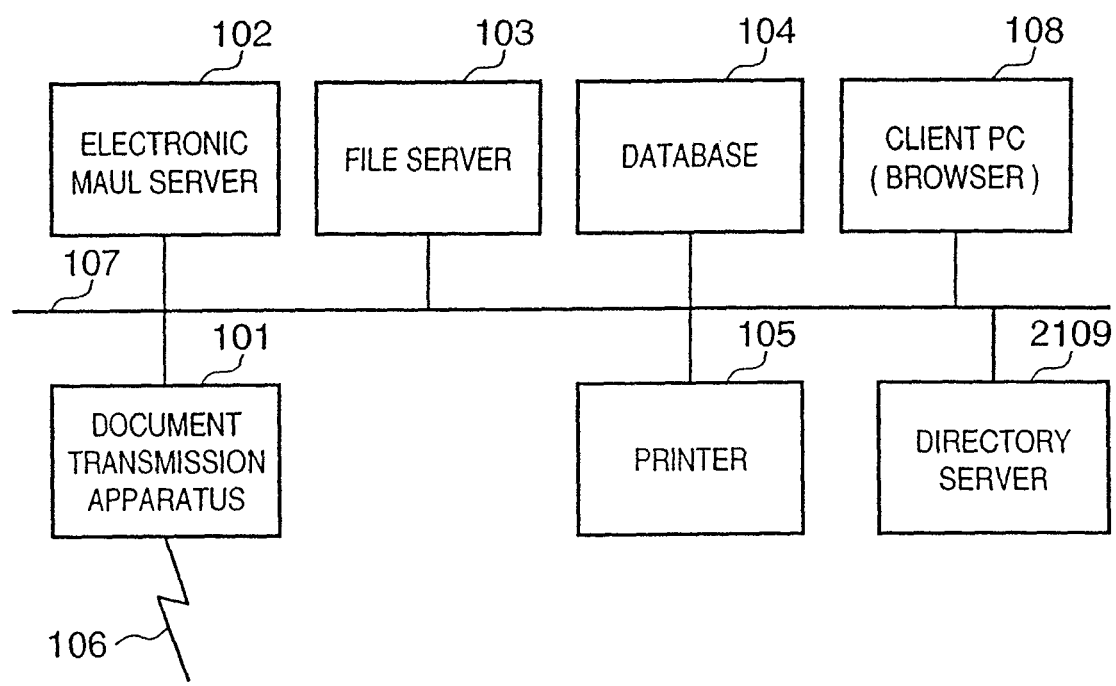
FIG. 21 is a block diagram showing a system according to the embodiment utilizing a directory server for address information.

In FIG. 21, numeral 2109 denotes a directory server which provides services based on directory-service standards X.500. The address book is held in the directory server 2109, and is connected to the document transmission apparatus 101 by LDAP (lightweight Directory Access protocol) as an access protocol to the directory server via the network, whereby the address book can be referred to and updated from the document transmission apparatus 101.

FIG. 22 is an example of a script of the address book held in the directory server 2109. FIG. 22 shows an example of the script of the address book described in a format based on the X.500 standards. In a script 2201 of the address book, a set of sentences partitioned with an empty line describes information on one abstract destination. In this example, numeral 2202 denotes an abstract destination; 2203 to 2206, detailed destinations; and 2207 and 2208, declarations of members of a transmission destination group.

Further, similar processing may be realized by encoding the flow of FIG. 18 based on the block diagram of FIG. 14 and recording the coded flow in a storage medium, and by loading the program to a general computer.

This program is stored in, e.g., the storage medium FD 212 as an object program. FIG. 12 shows the structure of the stored contents.

As shown in FIG. 13, the document transmission program and its related data stored in the storage medium FD 212 can be loaded onto the present computer system 1300 via the FD driver 204. When the storage medium FD is inserted into the FD drive 204, a transmission destination setting program and the related data are read from the storage medium FD 212 then loaded onto the RAM 203 and become operative, under the control of the OS 1102 and the basic I/O program 1101.

FIG. 11 is a table showing an example of a memory map of the RAM 203 where the document transmission program is loaded and is executable. The RAM 203 has a structure comprising areas for the basic I/O program 1101, the OS 1102, the document-transmission program module group 1103, the related data 1104, and the work area 1105.

Further, in the above description, the document transmission program and the related data are directly loaded from the storage medium FD 212 onto the RAM 203 and executed; however, it may be arranged such that the transmission destination setting program and management data are temporarily stored (installed) into the HD 205, and when the transmission destination setting program is operated, the stored program and the management data are loaded from the HD 205 onto the RAM 203.

Further, the medium for storing the transmission destination setting program may be a CD-ROM, an IC memory card and the like other than the FD (212). Further, it may be arranged such that the transmission destination setting program is stored in the ROM 202, and directly executed by the CPU 201 as a part of the memory map.

Second Embodiment

Figure 23:
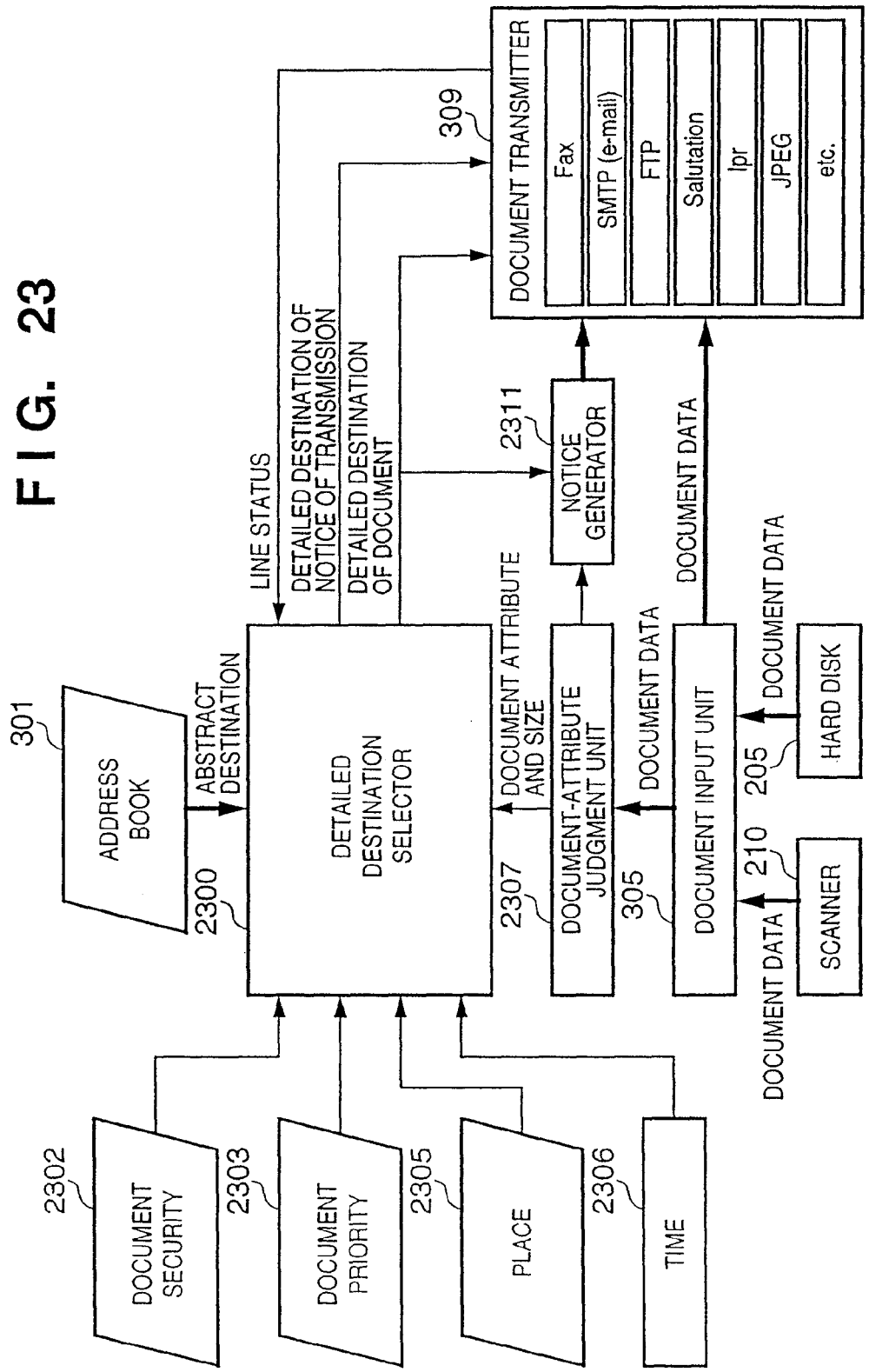
FIG. 23 is a block diagram explaining processing for transmitting a notice of transmission to notify document transmission to a receiver.

FIG. 23 is a block diagram showing another embodiment of the present invention.

In FIG. 23, a detailed destination selector 2300 selects a detailed destination (a transmission method and a destination) to which a document is actually transmitted, from a group of detailed destinations indicated by an abstract destination designated by a user, by comparing conditions described in the address book 301 with information, operational environment and document attribute provided by the user. Similarly, the detailed destination selector 2300 selects a detailed destination to which a notice of transmission is transmitted. The selected detailed destination of the document and that of the notice of transmission are provided to the document transmitter 309 and used for transmission of the document and the notice of transmission. Further, the detailed destination of the document is provided to a notice generator 2311 and is used as information for generating the notice of transmission.

As shown in FIG. 23, the conditions (selection conditions) for using a detailed destination group and detailed destinations in transmission of documents and notice of transmission are described in the address book 301 with the abstract destinations, and held on the hard disk 205.

In FIG. 23, document security 2302 is information provided by the user for each document transmission. The document security 2302 is used as reference information for selecting a detailed destination by the detailed destination selector 2300.

Also, document priority 2303 is information provided by the user for each document transmission. The document priority 2303 is used as reference information for selecting a detailed destination by the detailed destination selector 2300.

Further, place 2305 where the document transmission apparatus 101 operates is information provided by the user for each document transmission. The place 2305 is used as reference information for selecting a detailed destination by the detailed destination selector 2300. In the present embodiment, the place information is designated based on a telephone number of a place where the document transmission apparatus operates.

Further, time 2306 provides information on date, day and time of document transmission to the detailed destination selector 2300.

A document-attribute judgment unit 2307 judges attributes of document, read from the scanner 210 or held in the hard disk 205 by an instruction from the document input unit 305, such as vertical and lateral sizes, the number of pages, information indicating whether the document is a color/monochrome document, and document data size, and provides the results of judgment to the detailed destination selector 2300. These document attributes are used as reference information for selecting a detailed destination and as information for generating a notice of transmission by the notice generator 2311.

Figure 26:
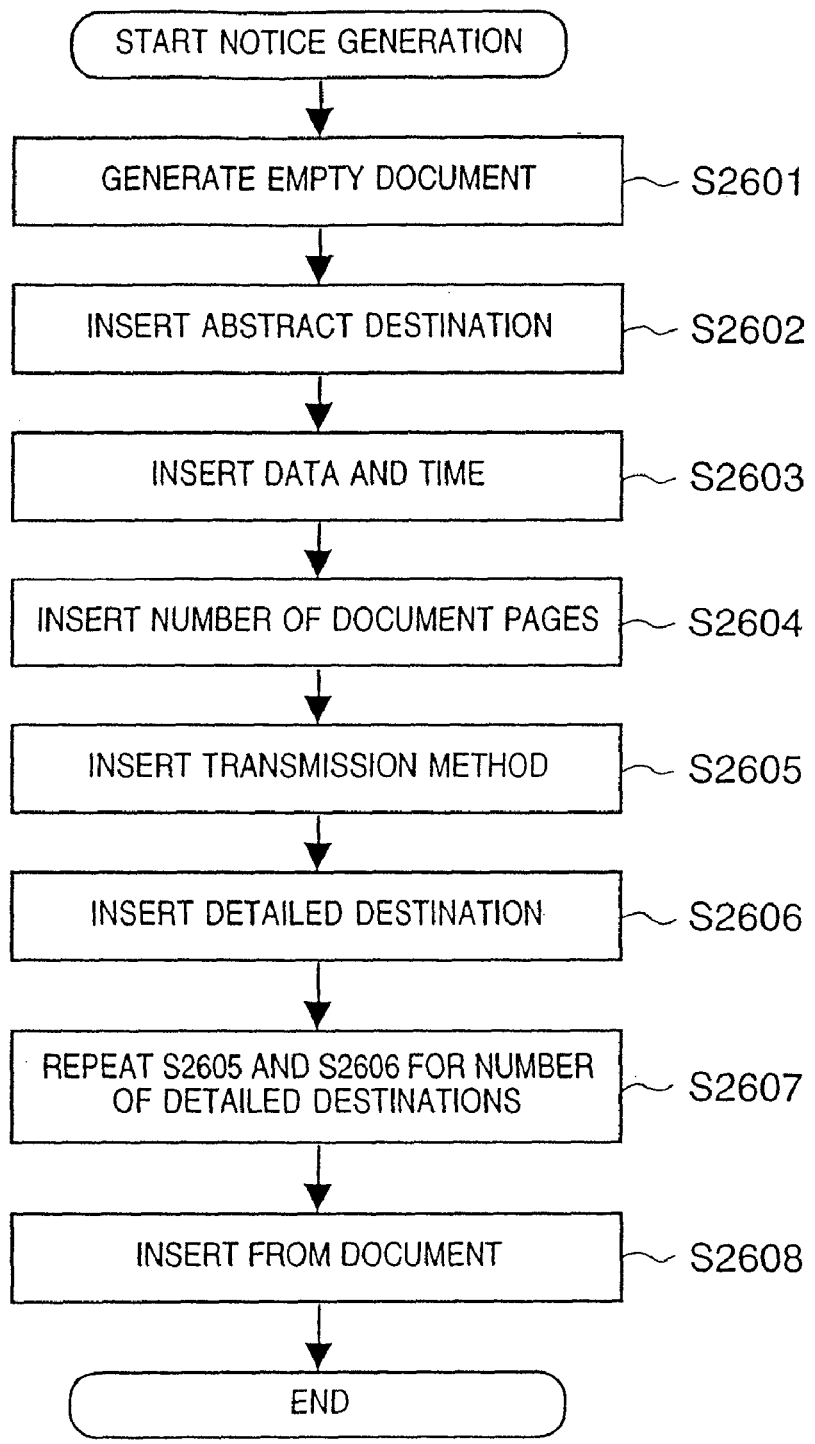
FIG. 26 is a flowchart showing processing for generating the notice of transmission.

The notice generator 2311 operates in accordance with the flowchart of FIG. 26, to generate a notice of transmission from the information from the detailed destination selector 2300 and the document-attribute judgment unit 2307.

The document transmitter 309 examines the statuses of the network 107 and the telephone line 106, used in document transmission, the statuses of the electronic mail server 102, the file server 103, the data base 104 and the printer 105, used in document transmission via the network, and provides information as to whether or not they are available for document transmission to the detailed destination selector 2300. Further, the document transmitter 309 transmits a document provided from the document input unit 305 and a document provided from the notice generator 2311 to detailed destinations provided from the detailed destination selector 2300.

FIG. 24 shows contents of the address book 301 in this case.

A script 2401 of the address book is described in a format based on the X.500 standards, and is held as a file existing on the hard disk 205. In the format as shown in FIG. 24, a set of sentences partitioned with an empty sentence describes one abstract destination. In this example, numeral 2402 denotes an abstract destination; 2403 to 2406, respective detailed destinations of a facsimile apparatus, an electronic mail, a printer and a remote file; 2407, detailed-destination selection conditions for document transmission; and 2409, detailed-destination selection conditions for transmission of notice of transmission.

As shown in FIG. 24, the detailed-destination selection conditions 2407 are represented by comparisons between keywords and values and logical expressions including these comparisons. FIG. 25 shows the expressions of the detailed destination selection conditions 2407 and 2409, the keywords used in these conditions and the ranges of allowable values. The detailed destination selector 2300 calculates the respective conditional expressions 2407 with given conditions, and selects a detailed destination with a "true" value. As the conditional expressions 2407 are independently evaluated, a plurality of detailed destinations may be selected. In this case, the document transmitter 309 is instructed to transmit a document to the plurality of detailed destinations. Further, none of the calculation results may be "true". In this case, a default detailed destination 2408 is selected.

As shown in the conditions 2409, a selected detailed destination of the document may be used as a condition for designating a detailed destination of a notice of transmission. As described above, in case of notice of transmission, a plurality of detailed destinations may be selected since the conditional expressions 2409 are independently evaluated, and in such case, the document transmitter 309 is instructed to transmit the notice of transmission to the plurality of detailed destinations. Further, when none of the results of calculation of the conditional expressions is "true", a default detailed destination 2410 is selected. In this example, the default detailed destination of notice of transmission is "NONE" (notice of transmission is not transmitted).

FIG. 26 is a flowchart showing processing for generating a notice of transmission by the notice generator 2311.

In FIG. 26, an empty document (blank document) is generated at step S2601. At step S2602, an abstract destination is inserted. At step S2603, a date and time are inserted. At step S2604, the number of document pages is inserted. At step S2605, the transmission method of a detailed destination is inserted. At step S2606, a detailed destination is inserted. At step S2607, steps S2605 and S2606 are repeated for the number of detailed destinations. Finally, at step S2608, a form document is inserted; thus, a notice of transmission is completed. The notice of transmission is transmitted in accordance with the transmission method of the designated destination. FIG. 27 shows an example of a completed notice of transmission.

In the above description, the area code of a place where the document transmission apparatus exists, inputted by the user, is used as the place information, however, a network address of the document transmission apparatus may be used as the place information. Further, it may be arranged such that information from a device which automatically detects the place of an apparatus such as a GPS (Global Positioning System) is obtained, and the latitude and longitude are used as the place information.

Further, the detailed destination selection conditions 2407 and 2409 are set for each destination in the script 2401 of the address book, and changed for each destination; however, it may be arranged such that the detailed destination selection conditions are held as an information base independent of the address book, and the detailed destination selector 2300 selects a detailed destination based on information from the information base.

Further, similar processing may be realized by encoding the flow based on the block diagram of FIG. 23 and storing the coded flow in a storage medium, and by loading the program into a general computer.

This program is stored in the storage medium FD 212 as a coded program. FIG. 12 shows the structure of the stored contents.

As shown in FIG. 13, the document transmission program and its related data stored in the storage medium FD 212 can be loaded onto the present computer system 1300 via the FD drive 204. When the storage medium FD is inserted into the FD drive 204, the document transmission program and the related data are read from the storage medium FD 212, then loaded onto the RAM 203, where they become operative, under the control of the OS 1102 and the basic I/O program 1101.

FIG. 11 is a table showing an example of a memory map of the RAM 203 where the document transmission program is loaded and is executable. The RAM 203 has a structure comprising areas for the basic I/O program 1101, the OS 1102, the document-transmission program module group 1103, the related data 1104, and the work area 1105.

Further, in the above description, the document transmission program and the related data are directly loaded from the storage medium FD 212 onto the RAM 203 and executed; however, it may be arranged such that the transmission destination setting program and management data are temporarily stored (installed) into the HD 205, and when the transmission destination setting program is operated, the stored program and the management data are loaded from the HD 205 onto the RAM 203.

Further, the medium for storing the document transmission program may be a CD-ROM, an IC memory card and the like other than the FD (212).

Further, the document transmission program may be stored in the ROM 202, and directly executed by the CPU 201 as a part of the memory map.

Further, the information provided by the user for each document transmission is used as the document security 2302 and the document priority 2303; however, such information may be obtained by analyzing the subject of a document provided from the user for each document transmission. The analysis is made by comparing the character string of the subject with a predetermined dictionary. The dictionary contains words, and the security or priority in use of each word. The character string of the subject is searched to find words existing in the dictionary, and the security or priority of the obtained plurality of words are used as the document security 2302 or document priority 2303.

Further, in the above description, the security and priority of the document are obtained by analyzing the subject of the document provided by the user; however, such information may be obtained by analyzing the document. In this case, the document-attribute judgment unit 2307 converts the document data into character string data by character recognition processing, and compares the obtained character string data with a dictionary as described above, to obtain the document security 2303 and the document priority 2303.

The present invention is not limited to the above embodiments and various changes and modifications can be made within the spirit and scope of the present invention. Therefore, to apprise the public of the scope of the present invention, the following claims are made.

What is claimed is:

1. A transmission apparatus, comprising:
an input unit that inputs image data;
a conversion unit that converts the image data input by the input unit; and
a transmission unit that transmits converted image data, which is obtained by a single conversion of the image data by the conversion unit, to first and second destinations, in a case where the first destination corresponding to a first transmission method and the second destination corresponding to a second transmission method are designated as a destination of the image data.

2. A transmission apparatus according to claim 1, wherein the transmission unit transmits the converted image data to the first and second destinations, in a case where image data of the same format is transmitted to the first and second destinations.

3. A transmission apparatus according to claim 2, wherein the same format indicates that a compression method is identical.

4. A transmission apparatus according to claim 1, further comprising a determination unit that determines a format of image data to be transmitted to a destination in accordance with the destination designated by a user.

5. A transmission apparatus according to claim 1, further comprising a classification unit that classifies a plurality of destinations designated by a user in a format of the image data to be transmitted.

6. A transmission apparatus according to claim 1, wherein the first transmission method is to transmit image data by an electronic mail and the second transmission method is to transmit image data in a file transfer protocol.

7. A method of controlling a transmission apparatus, the method comprising:
inputting image data;
converting the image data input in the inputting step; and
transmitting converted image data, which is obtained by a single conversion of the image data in the converting step, to first and second destinations, in a case where the first destination corresponding to a first transmission method and the second destination corresponding to a second transmission method are designated as a destination of the image data.

8. A non-transitory computer readable storage medium storing a program for causing a computer to execute the following steps:
inputting image data;
converting the image data input in the inputting step; and
transmitting converted image data, which is obtained by a single conversion of the image data in the converting step, to first and second destinations, in a case where the first destination corresponding to a first transmission method and the second destination corresponding to a second transmission method are designated as a destination of the image data.

* * * * *